(12) United States Patent
Lewis

(10) Patent No.: US 6,378,066 B1
(45) Date of Patent: Apr. 23, 2002

(54) METHOD, APPARATUS, AND ARTICLE OF MANUFACTURE FOR DEVELOPING AND EXECUTING DATA FLOW PROGRAMS, AND OPTIMIZING USER INPUT SPECIFICATIONS

(75) Inventor: Bradley Lewis, Broomfield, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/244,138

(22) Filed: Feb. 4, 1999

(51) Int. Cl.[7] .......................... G06F 9/305; G06F 9/445; G06F 9/455

(52) U.S. Cl. ........................... 712/236; 714/37; 714/38; 714/35; 714/47; 717/4; 717/6; 712/13; 712/14; 712/28; 712/217; 712/245; 712/219

(58) Field of Search ......................... 704/232, 10, 255, 704/9, 256, 257; 706/50, 17, 45, 11, 20, 59, 40; 757/501.1, 520.1, 532; 703/23.15, 26; 714/738, 35, 47, 37, 138; 705/10; 709/107, 201, 331; 345/441, 22, 224; 716/4; 717/6, 9, 7, 4; 712/10, 13, 28, 245, 14, 22, 217, 203.9, 236, 27, 18, 219, 23

(56) References Cited

U.S. PATENT DOCUMENTS 4,675,832 A * 6/1987 Robinson et al ............ 345/441
5,325,533 A    6/1994 McInerney et al. ......... 395/700

(List continued on next page.)

FOREIGN PATENT DOCUMENTS

EP    0 703 534 A   3/1996
WO   WO 99/10812 A  3/1999

OTHER PUBLICATIONS

"Algorithm Visualization System: Introduction," available online at: eng.chula.ac.th/faculty/spj/research/avis/intro.html as of Jun. 10, 1999, 2 pages.

"Caching Objects in A Date Space", IBM Technical Disclosure Bulletin, IBM Corp., vol. 37, No. 10, Oct. 1994, pp. 587–590.

(List continued on next page.)

Primary Examiner—Daniel H. Pan
(74) Attorney, Agent, or Firm—Finnegan, Henderson, Farabow, Garrett and Dunner, L.L.P.

(57) ABSTRACT

Methods, systems, and articles of manufacture consistent with the present invention provide a development tool that enables computer programmers to design and develop a data flow program for execution in a multiprocessor computer system. The tool displays an interface that enables the programmer to define a region divided into multiple blocks, wherein each block is formed of a set of values associated with a function, and to define sets of the blocks, each block in a set having a state reflected by a designated portion of the program that when executed transforms the values forming the block based on the function. The interface also records any dependencies among the blocks, each dependency indicating a relationship between two blocks and requiring the portion of the program associated with a first block of the relationship to be executed before the portion of the program associated with a second block of the relationship. It further provides an efficient manner for a user to record dependencies between sets of multiple blocks. The interface also records the assignment of blocks to distribution groups that determine how the blocks are processed in parallel, thereby allowing different parallel processing schemes to be used during execution. After program development, blocks are selected for execution of the corresponding, designated portions of the program based on the recorded dependencies and distribution groups.

21 Claims, 19 Drawing Sheets

U.S. PATENT DOCUMENTS

| | | | | |
|---|---|---|---|---|
| 5,499,349 | A | 3/1996 | Nikhil et al. | 395/375 |
| 5,500,881 | A | 3/1996 | Levin et al. | 395/700 |
| 5,519,866 | A | 5/1996 | Lawrence et al. | 395/700 |
| 5,530,816 | A | 6/1996 | Holt | 395/375 |
| 5,613,063 | A | 3/1997 | Eustace et al. | 395/183.14 |
| 5,675,790 | A | 10/1997 | Walls | 395/621 |
| 5,675,802 | A | 10/1997 | Allen et al. | 395/703 |
| 5,689,712 | A | 11/1997 | Heisch | 395/704 |
| 5,742,793 | A | 4/1998 | Sturges et al. | 395/497.01 |
| 5,748,961 | A | 5/1998 | Hanna et al. | 395/701 |
| 5,784,698 | A | 7/1998 | Brady et al. | 711/171 |
| 5,787,480 | A | 7/1998 | Scales et al. | 711/148 |
| 5,850,554 | A | 12/1998 | Carver | 395/710 |
| 5,864,867 | A | 1/1999 | Krusche et al. | 707/104 |
| 5,867,649 | A | * 2/1999 | Larson | 709/201 |
| 5,872,977 | A | 2/1999 | Thompson | 395/703 |
| 5,905,488 | A | 5/1999 | Demers et al. | 345/173 |
| 5,963,975 | A | 10/1999 | Boyle et al. | 711/147 |
| 5,974,536 | A | 10/1999 | Richardson | 712/215 |
| 5,978,892 | A | 11/1999 | Noel et al. | 711/170 |
| 5,991,893 | A | 11/1999 | Snider | 714/4 |
| 6,016,474 | A | 1/2000 | Kim et al. | 705/1 |
| 6,018,793 | A | 1/2000 | Rao | 711/150 |
| 6,044,438 | A | 3/2000 | Olnowich | 711/130 |
| 6,085,029 | A | 7/2000 | Kolawa et al. | 395/183.14 |
| 6,101,525 | A | 8/2000 | Hecker | 709/104 |
| 6,125,430 | A | 9/2000 | Noel et al. | 711/152 |

OTHER PUBLICATIONS

"GeoMAMOS Project Home Page," available online at: ece.nwu.edu/–theory/geomamos.html as of Jun. 10, 1999, 4 pages.

"Introduction," available online at: ece.nwu.edu/–theory/gs tech 1 html/section 3 1.html as of Jun. 10, 1999, 2 pages.

"Purify for Windows NT, Product Overview," Ver. 6.0, available online at: rational.com/products/purify nt/index.jtmpl as of Jan. 11, 1999.

"Scientific Simulations and Algorithm Visualizations Using NESL and Java," available online at: cs.cmu.edu/–scandal/applets/ as of Jun. 10, 1999, 1 page.

"Visualization for Developing Geometric Algorithms," available online at: ece.nwu.edu/–theory/gs_tech_1_html/section3_3.html s of Jun. 10, 1999, 2 pages.

Attali et al. "Sematic based visualization for parallel object–oriented programming", Proceedings in the 11th annual conference on Object oriented programming system. 1996, pp. 421–440.

Barry Wilkinson and Michael Allen, "Parallel Programming", Prentice Hall, 1999.

Conradi et al. "Version models for software configuration management", ACM Computing Surveys, vol. 30, No. 2, Jun. 1998, pp. 232–282.

David E. Culler and Jaswinder Pal Singh, "Parallel Computer Architecture", Morgan Kaufman Publishers, Inc., 1999.

Ian Foster, "Designing and Building Parallel Programs", Addison–Wesley Publishing Company, 1995.

Kevin Dowd and Charles R. Severance, "High Performance Computing", Second Edition, Chapter 10, Shared Memory Multiprocessors, Aug. 1998, pp. 216–218.

Pentium Processor Family User Manual Volume 3: Architecture and Programming Manual pp. 25–182, 25–183, 25–309 and 25–310 (1994).

Sun Microsystems Computer Company, "Prism 5.0 Reference Manual", Revision A., Nov. 1997.

Sun Microsystems, "UltraSPARC User's Manual", UltraSPARC–1, UltraSPARC–II, Jul. 1977, pp. 319–325.

Wasserman et al. "A Graphical, Extensible Integrated Environment for Software Development", Proceedings of the ACD SIGSOFT/SIGPLAN Software Engineering Symposium on Practical Software Development Environments, 1997, pp. 131–142.

* cited by examiner

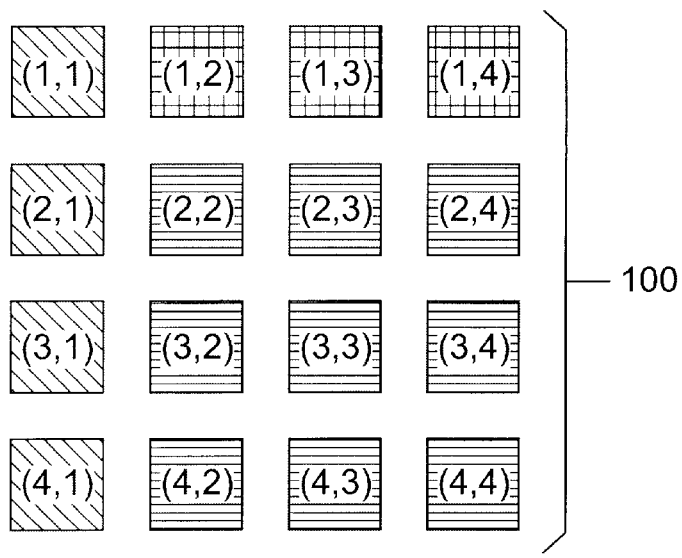
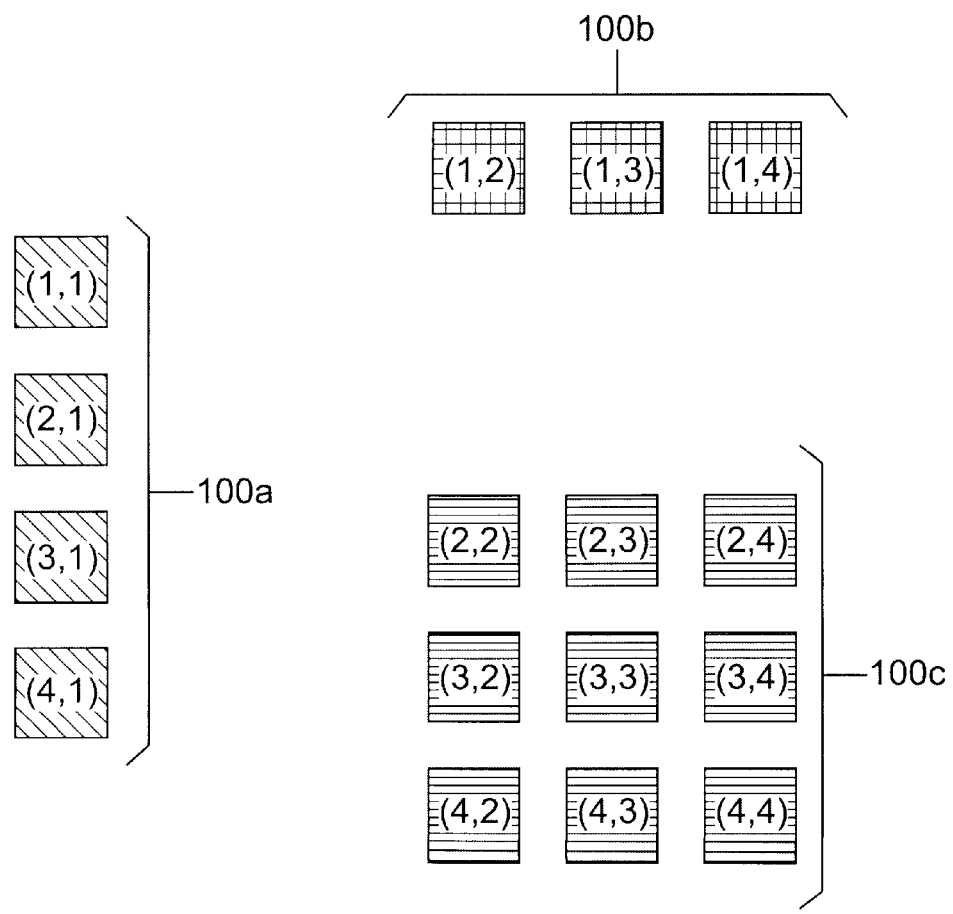
FIG. 2

METHOD, APPARATUS, AND ARTICLE OF MANUFACTURE FOR DEVELOPING AND EXECUTING DATA FLOW PROGRAMS, AND OPTIMIZING USER INPUT SPECIFICATIONS

This application is related to U.S. application Ser. No. 09/244,136 and U.S. application Ser. No. 09/244,137, which are incorporated in their entirety herein by reference.

BACKGROUND OF THE INVENTION

A. Field of the Invention

This invention relates to the field of multiprocessor computer systems and, more particularly, to data driven processing of computer programs using a multiprocessor computer system.

B. Description of the Related Art

Multiprocessor computer systems include two or more processors that may be employed to execute the various instructions of a computer program. A particular set of instructions may be performed by one processor while other processors perform unrelated sets of instructions.

Fast computer systems, like multiprocessor computer systems, have stimulated the rapid growth of a new way of performing scientific research. The broad classical branches of theoretical science and experimental science have been joined by computational science. Computational scientists simulate on supercomputers phenomena too complex to be reliably predicted by theory and too dangerous or expensive to be reproduced in a laboratory. Successes in computational science have caused demand for supercomputing resources to rise sharply in recent years.

During this time, multiprocessor computer systems, also referred to as "parallel computers," have evolved from experimental contraptions in laboratories to become the everyday tools of computational scientists who need the ultimate in computing resources in order to solve their problems. Several factors have stimulated this evolution. It is not only that the speed of light and the effectiveness of heat dissipation impose physical limits on the speed of a single processor. It is also that the cost of advanced single-processor computers increases more rapidly than their power. And price/performance ratios become more favorable if the required computational power can be found from existing resources instead of purchased. This factor has caused many sites to use existing work station networks, originally purchased to do modest computational chores, as "SCAN"s (SuperComputers At Night) by utilizing the workstation network as a parallel computer. This scheme has proven so successful, and the cost effectiveness of individual workstations has increased so rapidly, that networks of workstations have been purchased to be dedicated to parallel jobs that used to run on more expensive supercomputers. Thus, considerations of both peak performance and price/performance are pushing large-scale computing in the direction of parallelism. Despite these advances, parallel computing has not yet achieved wide-spread adoption.

The biggest obstacle to the adoption of parallel computing and its benefits in economy and power is the problem of inadequate software. The developer of a program implementing a parallel algorithm for an important computational science problem may find the current software environment to be more of an obstruction than smoothing the path to use of the very capable, cost-effective hardware available. This is because computer programmers generally follow a "control flow" model when developing programs, including programs for execution by multiprocessor computers systems. According to this model, the computer executes a program's instructions sequentially (i.e., in a series from the first instruction to the last instruction) as controlled by a program counter. Although this approach tends to simplify the program development process, it is inherently slow.

For example, when the program counter reaches a particular instruction in a program that requires the result of another instruction or set of instructions, the particular instruction is said to be "dependent" on the result and the processor cannot execute that instruction until the result is available. Moreover, executing programs developed under the control flow model on multiprocessing computer systems results in a significant waste of resources because of these dependencies. For example, a first processor executing one set of instructions in the control flow program may have to wait for some time until a second processor completes execution of another set of instructions, the result of which is required by the first processor to perform its set of instructions. This wait-time translates into an unacceptable waste of computing resources in that at least one of the processors in this two-processor configuration is idle the whole time while the program is running.

To better exploit parallelism in a program some scientists have suggested use of a "data flow" model in place of the control flow model. The basic concept of the data flow model is to enable the execution of an instruction whenever its required operands become available, and thus, no program counters are needed in data-driven computations. Instruction initiation depends on data availability, independent of the physical location of an instruction in the program. In other words, instructions, in a program are not ordered. The execution simply follows the data dependency constraints.

Programs for data-driven computations can be represented by data flow graphs. An example data flow graph is illustrated in FIG. 1 for the calculation of the following expression:

$$z=(x+y)*2$$

When, for example, x is 5 and y is 3, the result z is 16. As shown graphical in the figure, z is dependent on the result of the sum and x and y. The data flow graph is a directed acyclic graph ("DAG") whose nodes correspond to operators and arcs are pointers for forwarding data. The graph demonstrates sequencing constraints (i.e., constraints with data dependencies) among instructions.

For example, in a conventional computer, program analysis is often done (I) when a program is compiled to yield better resource utilization and code optimization, and (ii) at run time to reveal concurrent arithmetic logic activities for higher system throughput. For instance, consider the following sequence of instructions:

1. $P=X+Y$
2. $Q=P/Y$
3. $R=X*P$
4. $S=R-Q$
5. $T=R*P$
6. $U=S/T$

The following five computational sequences of these instructions are permissible to guarantee the integrity of the result when executing the instructions on a serial computing system (e.g., a uniprocessor system):

1,2,3,4,5,6
1,3,2,5,4,6
1,3,5,2,4,6
1,2,3,5,4,6
1,3,2,4,5,6

For example, the first instruction must be executed first, but the second or third instruction can be executed second, because the result of the first instruction is required for either the second or third instruction, but neither the second nor the third requires the result of the other. The remainder of each sequence follows this simple rule-no instruction can be run until its operands (or inputs) are available.

In a multiprocessor computer system with two processors, however, it is possible to perform the six operations in four steps (instead of six) with the first processor computing step 1, followed by both processors simultaneously computing steps 2 and 3, followed by both processors simultaneously computing steps 4 and 5, and finally either processor computing step 6. This is an obvious improvement over the uniprocessor approach because execution time is reduced.

Using data flow as a method of parallelization will thus extract the maximum amount of parallelism from a system. Most source code, however, is in a control form, which is difficult and clumsy to parallelize efficiently for all types of problems.

It is therefore desirable to provide a facility for developers to more easily develop data flow programs and to convert existing control flow programs into data flow programs for execution on multiprocessor computer systems. There is also a need for a technique that allows a user to optimize the programs by inputting various specifications.

SUMMARY OF THE INVENTION

Methods, systems, and articles of manufacture consistent with the present invention overcome the shortcomings of existing systems by enabling developers to easily convert control flow programs into a data flow approach and to develop new programs according to the data flow model. According to one aspect of the present invention, such methods, systems, and articles of manufacture, as embodied and broadly described herein, this program development process includes defining a memory region and dividing it into multiple blocks, each block defining a set of values associated with a function. Sets of the blocks are defined, each block in a set having a state reflected by a designated portion of the program that when executed transforms the values forming the block based on the function. Additionally, any dependencies among the blocks are specified by the user. Each dependency indicates a relationship between two blocks and requires the portion of the program associated with one of the two blocks to be executed before the portion of the program associated with the other block.

In accordance with another aspect of the present invention, methods, systems, and articles of manufacture, as embodied and broadly described herein, execute a data flow program in a multiprocessor computer system. Execution of the program involves selecting information in a queue identifying a block formed of a set of values associated with a function of the program and determining whether execution of a portion of the program associated with the selected block is dependent on a result of the execution of a portion of the program associated with another block. The portion of the program associated with the selected block is then executed when it is determined that execution of the portion of the program associated with the selected block is not dependent on a result of the execution of a portion of the program associated with the other block. This selection and determination is repeated when it is determined that execution of the portion of the program associated with the selected block is dependent on a result of the execution of a portion of the program associated with the other block.

In accordance with yet another aspect of the present invention, methods, systems, and articles of manufacture are provided that allow a user to optimize the program development process by inputting various specifications. This program development process includes defining a memory region, dividing it into blocks, and defining aspects of elements in the blocks of the memory region. Code is provided that allows a user to write control flow program code that accesses elements of the blocks. Further, to facilitate the specification of dependencies between blocks by the user, a method is provided for efficiently creating dependencies between sets of blocks. Additionally, a method is provided to allow a user to flexibly group blocks together for processing, thereby allowing variation in the parallel processing schemes used.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 2 depicts a block diagram illustrating an example of a memory region defined in a manner consistent with the present invention;

DETAILED DESCRIPTION

Figure 1:
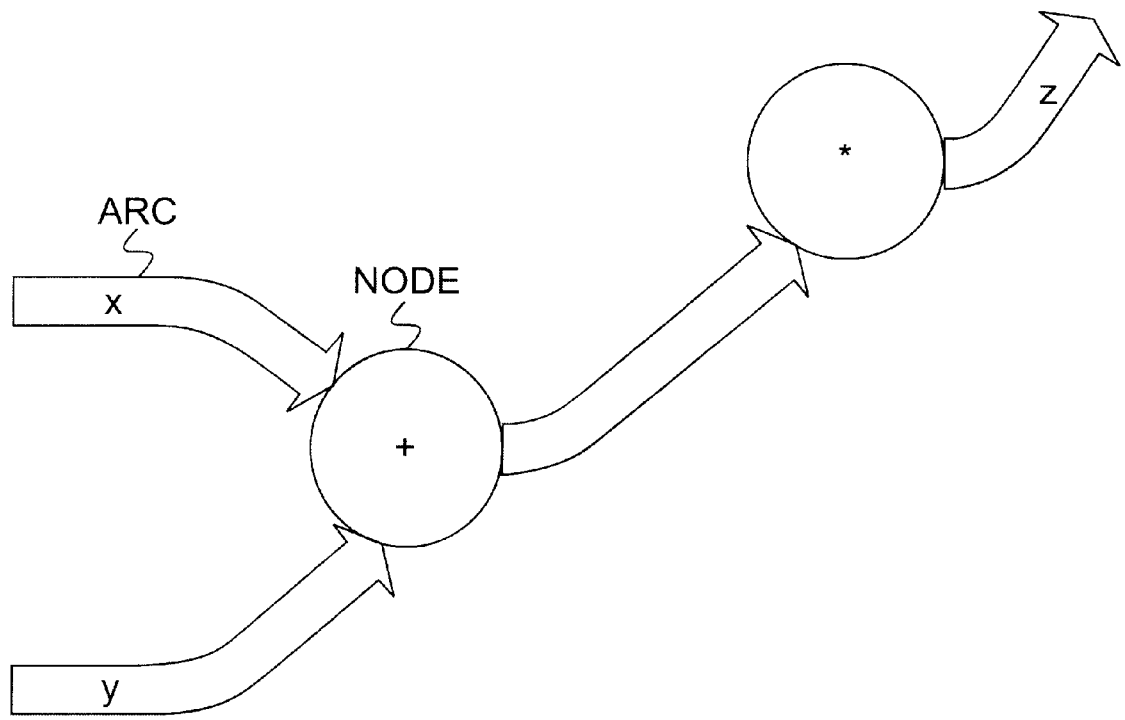
FIG. 1 depicts an example data flow graph for the calculation of a particular expression.

Reference will now be made in detail to an implementation consistent with the present invention as illustrated in the accompanying drawings. Wherever possible, the same reference numbers will be used throughout the drawings and the following description to refer to the same or like parts.
Introduction Methods, systems, and articles of manufacture consistent with the present invention enable developers to convert control flow programs into data flow programs and to develop new programs according to the data flow model. Such methods, systems, and articles of manufacture may utilize a development tool, including a computer-human interface, to design and develop the data flow programs.

Data flow programs developed in accordance with the principles of the present invention are executed on a multiprocessor computer system using a data flow model. The interface may be operated on a different data processing system from that used for program execution. Alternatively, the interface may be operated on the same system used for program execution.

One characteristic of the data flow model in accordance with the present invention is that operations can be performed in parallel on blocks of a memory region. A block consists of a set of data, such as an array or matrix of values or other information. Together, multiple blocks form a memory region.

The data flow program development tool provides an interface that enables a developer to define a memory region containing data associated with a system. In this context, the term "system" refers to a physical, mathematical, or computational problem, such as the structural analysis of a building, the flow of fluid through a pipe, etc. Typically, such complex systems require a great deal of processing to solve many equations and the result of one set of equations is dependent on the result of another set of equations. For example, fluid flowing though a pipe is slowed by friction from the interior of the pipe. The friction directly affects the speed of the fluid touching the interior of the pipe (defined by a first set of equations) and indirectly affects other fluid in the pipe not touching the interior (defined perhaps by the same equations but dependent on the result of the first set of equations). Thus, the effects of friction caused by the interior of the pipe are different for fluid flowing in the pipe depending on where in the fluid is in the pipe at any given instance.

After defining the region, the developer then divides the region into blocks, and for each block, the developer specifies the program code to be executed on the values within the block as well as any dependency between the block and other blocks in the region. Blocks with the same program code are said to share the same "state." They can generally be executed in parallel because they do not depend on one another for results. In the fluid flow example, blocks associated with fluid flowing next to the interior of the pipe would share the same state (and therefore have the same program code for execution) but this state (and code) would be different from the state (and code) of fluid that is not touching the interior but is next to the fluid that is. Moving inwardly into the pipe and the state (and code) of each block associated with fluid in the pipe changes to reflect the dependencies in a similar manner.

Dependencies are reflected in links between each of the dependent blocks and the blocks from which they depend. A block is dependent on another block when the first block requires the result of the second block for the first block to perform properly within the system. These relationships may be viewed graphically through a directed acyclic graph ("DAG"). Associated with each node in the graph are program code and data determined by the block.

The blocks are then queued for processing in a multiprocessor computer system. Actually, the blocks themselves are not put in the queue. Rather, information identifying each block such as a pointer is placed in the queue. The blocks are queued or organized in the queue in a particular manner and the thread(s) executing the data flow program can select the appropriate block for execution of its corresponding program code at any given point in time during the data flow program execution. In one implementation, the blocks are queued according to the dependency information associated with each block.

The developer may designate the number of threads available to process the blocks. Each thread maintains a program counter and temporary memory, as needed, to perform the program code associated with the blocks. For example, the developer may designate one thread per processor. Alternative configurations are also possible in accordance with the principles of the present invention.

Each thread, in turn, selects a block from the queue and executes the program code designated by the developer for that block. As long as there are blocks in the queue, the threads, when available, select them and execute their program code. Additionally, queued blocks are selected for execution in a manner that reflects each block's dependency information. When an available thread selects a queued block for execution, the thread first examines the block's dependency information (i e., any links to other blocks) and if the blocks from which the selected block depends have completed execution, then the thread can proceed to execute the program code for the selected block. Otherwise, the thread may enter a wait state until it can begin executing the program code for the selected block. Alternatively, the thread may select the next available block in the queue, based on any priority if appropriate, and examine that block to determine its status with respect to any blocks upon which it depends (i.e., have all blocks from which it depends completed execution so that the program code of the selected block can be executed safely). This process continues until the threads have completed executing the program code associated with all blocks in the queue.

Additionally, a user is provided with a way of making additional specifications to programs during the development process. Among these specifications are the ability to specify attributes of elements in blocks in the memory region and the ability to efficiently specify dependencies between sets of multiple blocks. Furthermore, the system provides code, referred to as "macros," to allow a user to write control flow program code that accesses elements of a block. Additionally, the user may assign sets of blocks to distribution groups that determine how the blocks will be processed in parallel. The user is thus provided a flexible means of solving a problem using different parallelization schemes.

The following description includes details on the design and development of data flow programs followed by aspects of the execution phase.
Defining a Data Flow Program Using Regions and Blocks At the beginning of the design and development process, a developer specifies a memory region and divides the region into blocks. This may be done graphically using an interface provided with the development tool. FIG. 2 shows an example of a memory region 100 that contains sixteen blocks arranged in a four-by-four matrix, with each block identified by a row number and column number. For example, the block in the upper left corner of memory region 100 is labeled (1,1) indicating that it is located in the first row and the first column, and the block in the lower right hand corner of region 100 is labeled (4,4) indicating that it is located in the lower right corner. All of the remaining fourteen blocks follow the same labeling convention. As explained, each block contains a data set, such as a matrix or array of values or information, to be processed in accordance with certain program code.

After defining the memory region and dividing it into blocks, the developer specifies a state of each block. As explained, the state of a block corresponds to the program code that the developer assigns to that block, meaning that the developer intends to have the multiprocessor computer system operate on the data in the block using the specified program code. The interface provides the developer with a window or other facility to provide the program code for a block. The development tool associates the code with its block.

In the example region 100, the group of blocks 100a labeled (1,1), (2,1), (3,1), and (4,1) share the same state, the group of blocks 100b labeled (1,2), (1,3), and (1,4) share the same state, and the group of blocks 100c labeled (2,2), (2,3), (2,4), (3,2), (3,3), (3,4), (4,2), (4,3), and (4,4) share the same state. The three different states are shown in FIG. 2 by different shading (or fill) for the blocks in each group.

Although the region 100 and its blocks are shown as being uniform in size, in practice a memory region and blocks may have different shapes and sizes. For example, memory region 100 consists of sixteen blocks in a four-by-four matrix and, although not specified in the figure, each block may have an eight-by-eight matrix. Alternatively, and depending on the application, the memory region may consist of a four-by-three matrix of blocks and each block may consist of a three-by-two matrix of data.

Figure 3A:
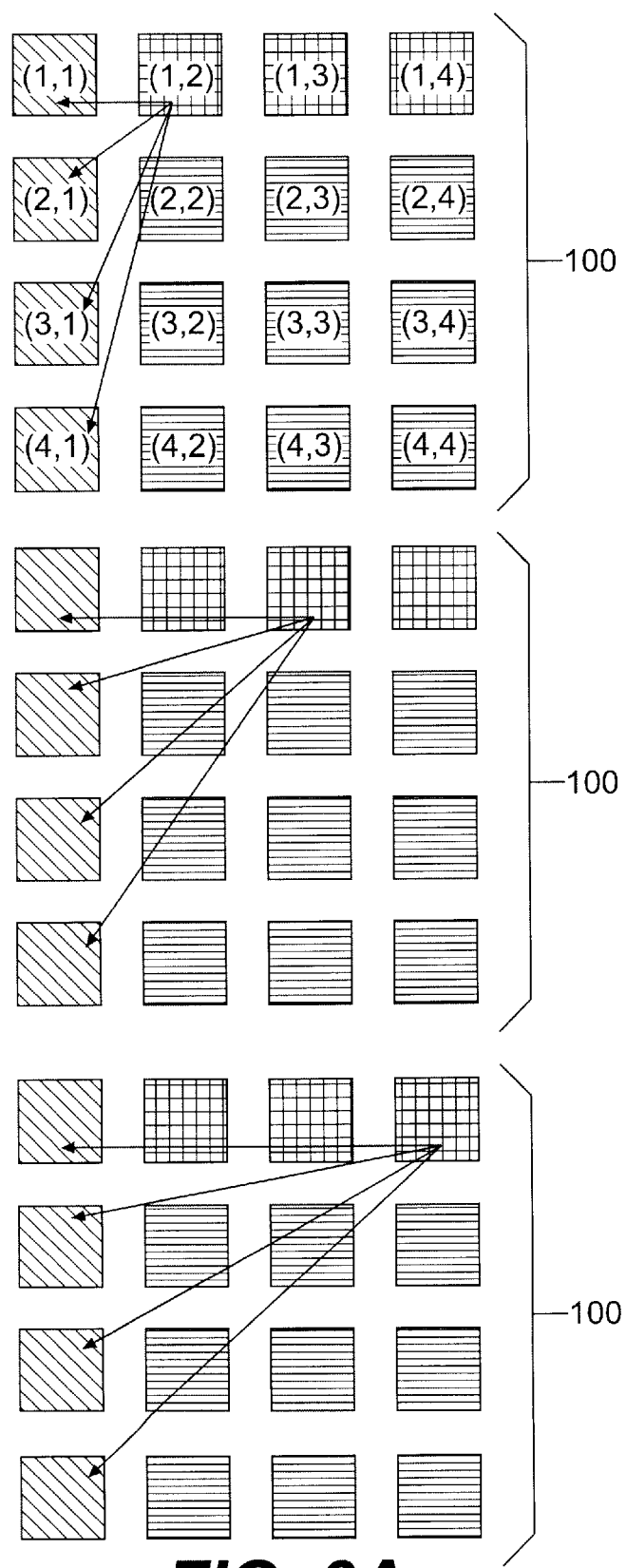
FIGS. 3A and 3B depict block diagrams illustrating an example of dependency relationships among the blocks of the memory region illustrated in FIG. 2.
Figure 3B:
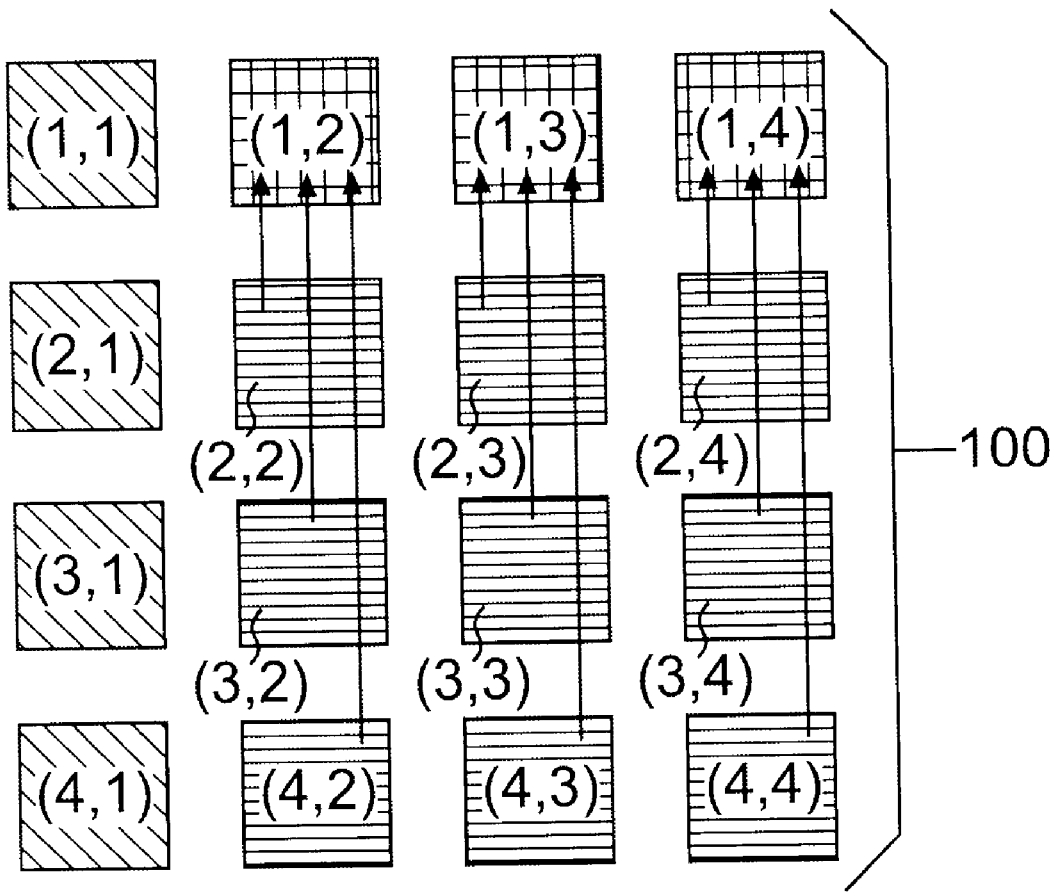

Next, the developer specifies any dependency relationships among the blocks. Again, a dependency relationship is defined as a relationship in which one block is dependent upon the result or final state of another block during program execution. In other words, one block has to be processed before the second, dependent block can be processed. FIGS. 3A and 3B illustrate a number of examples of dependency relationships using region 100 of FIG. 2. As shown in FIG. 3A, each of the blocks labeled (1,2), (1,3), and (1,4) are dependent on the blocks labeled (1,1), (2,1), (3,1), and (4,1). This means that all of the blocks labeled (1,1), (2,1), (3,1), and (4,1) must be processed before any of the blocks (1,2), (1,3), and (1,4).

Similarly, FIG. 3B illustrates dependencies among each of the blocks labeled (1,2), (1,3), and (1,4) and the blocks labeled (2,2), (2,3), (2,4), (3,2), (3,3), (3,4), (4,2), (4,3), and (4,4). As shown, the block labeled (1,2) must be processed before the blocks in the same column labeled (2,2), (2,3), (2,4); the block labeled (1,3) must be processed before the blocks in the same column labeled (3,2), (3,3), (3,4); and the block labeled (1,4) must be processed before the blocks in the same column labeled (4,2), (4,3), and (4,4). The figures simply illustrate one example of a dependency configuration for memory region 100; other configurations may be selected by the developer.

Figure 4:
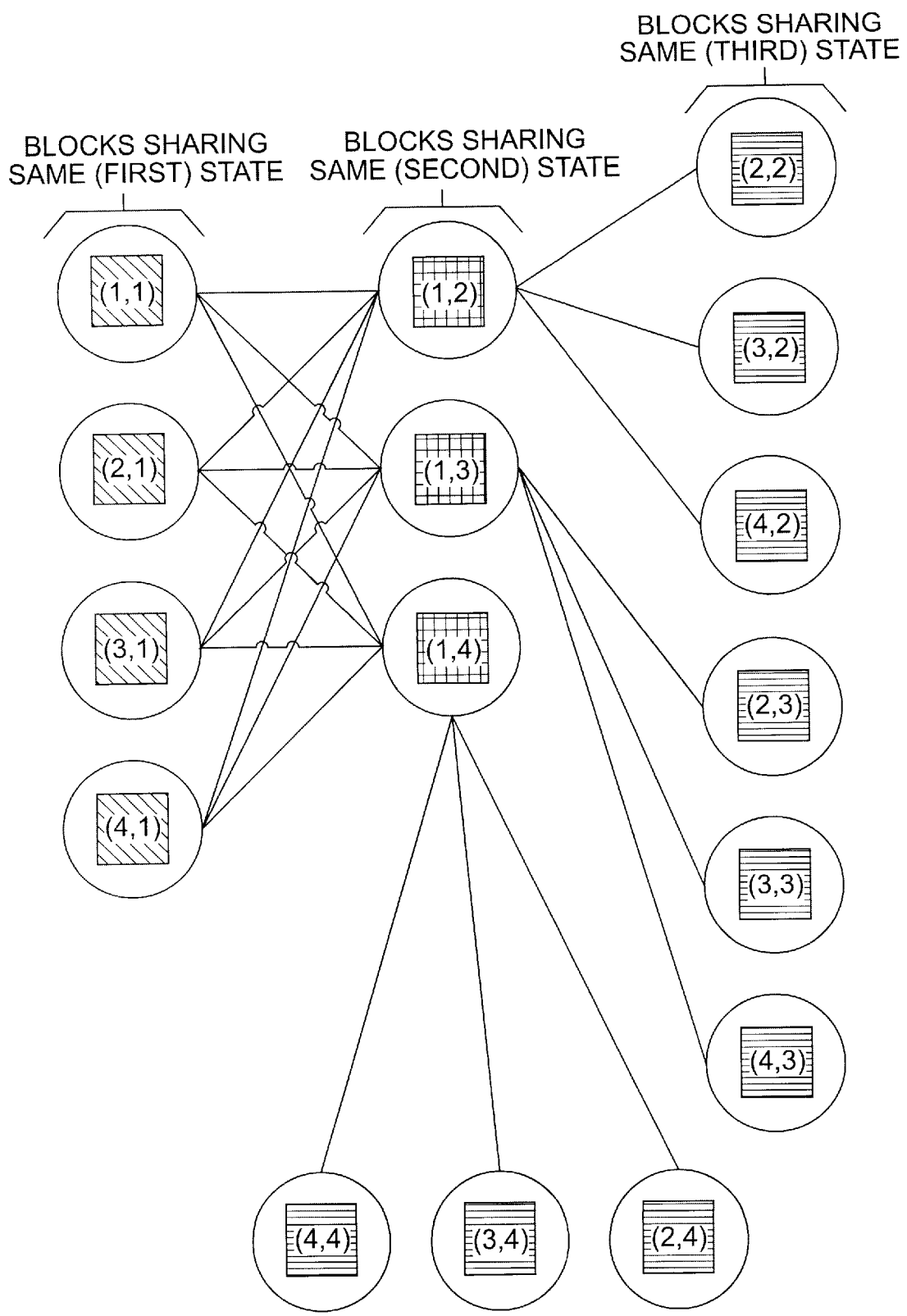
FIG. 4 depicts an example of a directed acyclic graph illustrating the dependency relationships corresponding to FIGS. 3A and 3B.

To complete the view of dependency relationships, it is useful to see them graphically which can also be done using the user interface. FIG. 4 is a DAG illustrating the dependency relationships shown in FIGS. 3a and 3b. The DAG of FIG. 4 illustrates graphically that the output of all of the blocks sharing the first state are required for processing by each of the blocks sharing the second state. In turn, each of the blocks sharing the second state must be processed before each of the three groups of three blocks that share the third state are processed. Such a graph may be used to order the blocks for processing in accordance with the principles of the present invention (discussed below).

Data Flow Program Development Tool

Computer Architecture

Figure 5:
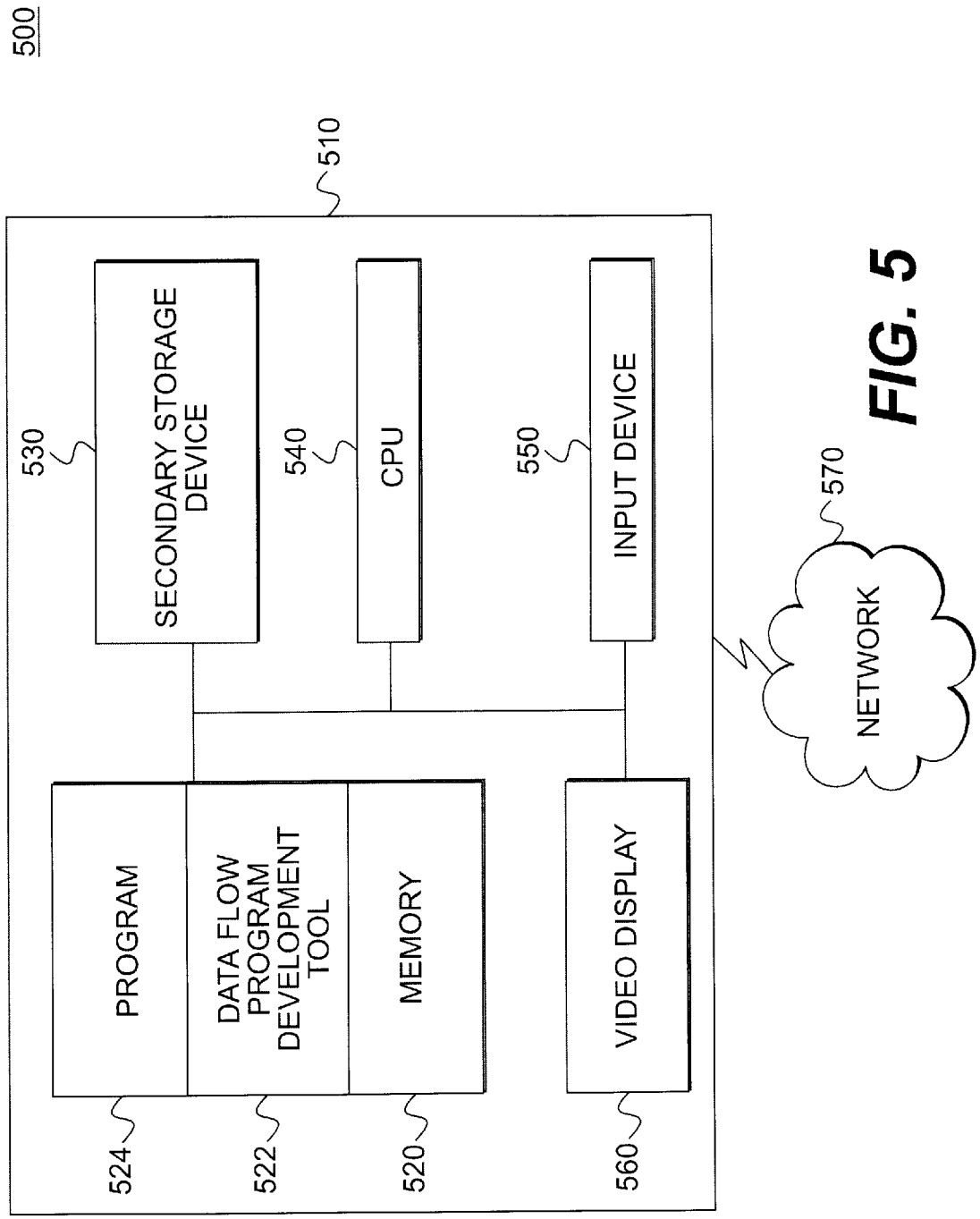
FIG. 5 depicts a block diagram of an exemplary data processing system with which the invention may be implemented.

FIG. 5 depicts an exemplary data processing system 500 suitable for practicing methods and implementing systems consistent with the present invention. Data processing system 500 includes a computer system 510 connected to a network 570, such as a Local Area Network, Wide Area Network, or the Internet.

Computer system 510 contains a main memory 520, a secondary storage device 530, a central processing unit (CPU) 540, an input device 550, and a video display 560. Main memory 520 contains a data flow program development tool 522 and program 524. Data flow program development tool 522 provides the interface for designing and developing data flow programs, including programs that utilize control flow program code. Using display 560 the tool enables developers to design memory regions, such as region 100 of FIG. 2, and divide the regions into blocks with corresponding states. The tool further enables developers to write program code to operate on each of the blocks using a multiprocessor computer system (see FIG. 7).

Program 524 represents a data flow program designed in accordance with the present invention, for example, using tool 522. Program 524 consists of the information specifying a memory region, the blocks of the region, the program code associated with each block, and any dependency relationships between the blocks.

Although aspects of one implementation are depicted as being stored in memory 520, one skilled in the art will appreciate that all or part of systems and methods consistent with the present invention may be stored on or read from other computer-readable media, such as secondary storage devices, like hard disks, floppy disks, and CD-ROM; a carrier wave received from a network such as the Internet; or other forms of ROM or RAM. Finally, although specific components of data processing system 500 have been described, one skilled in the art will appreciate that a data processing system suitable for use with methods and systems consistent with the present invention may contain additional or different components.

Process

Figure 6:
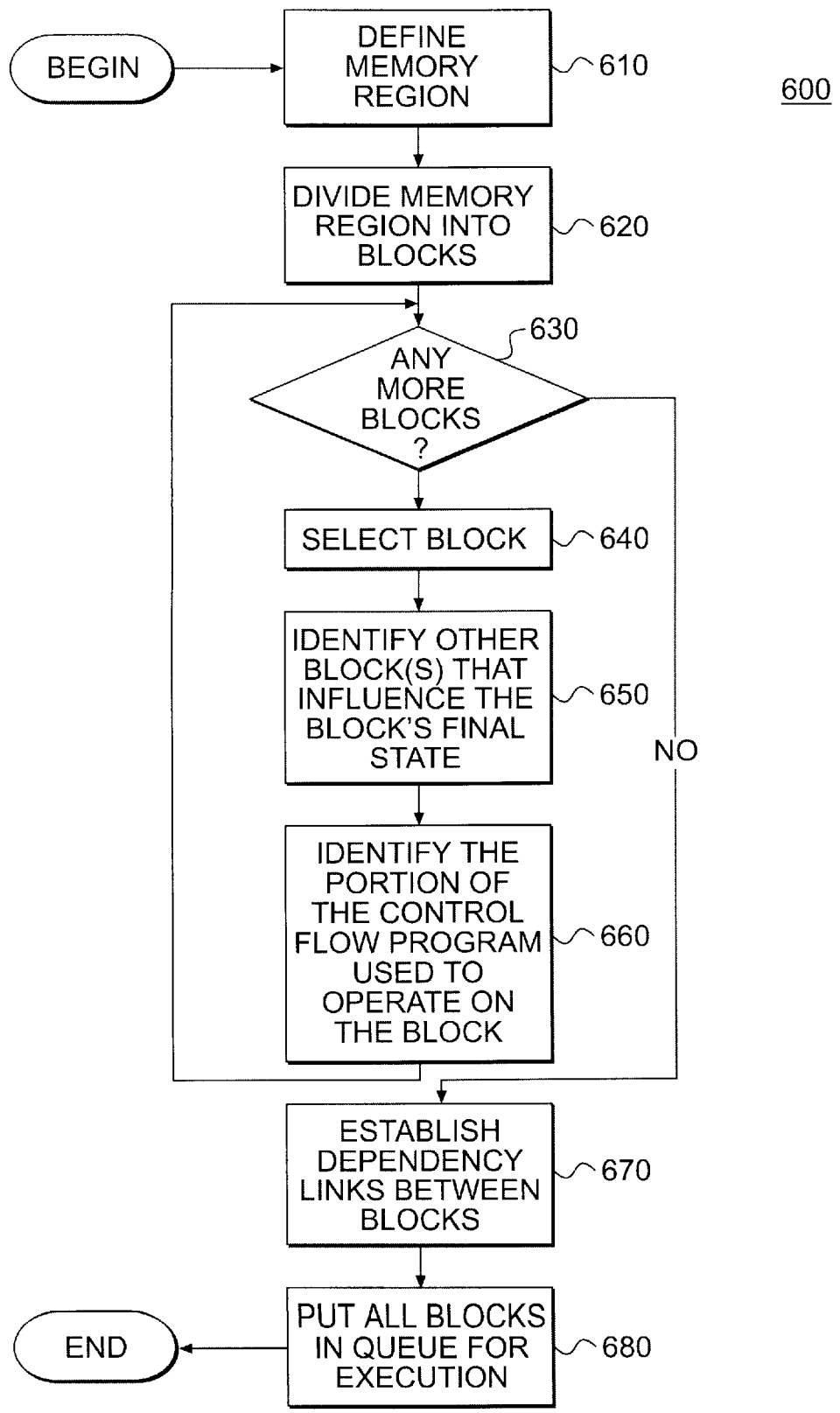
FIG. 6 depicts a flow chart of the operations performed by a data flow program development tool consistent with the present invention.

FIG. 6 is a flow chart of the process 600 performed by developers to write programs using the data flow model. This process may be performed by tool 522 in a manner consistent with the principles of the present invention. As explained, tool 522 provides an environment, including a user interface and related functionality, for software developers to write programs using the data flow model.

After a developer initiates execution of tool 522, it displays the various views necessary for the developer to write a data flow program. First, the tool displays a view with which the developer defines a memory region (step 610). Using tool 522, the developer then divides the region into blocks (step 620).

As long as there are blocks in a region to be processed (step 630), the developer selects a block (step 640), identifies any other block(s) that influence the selected block's final state (in other words, block(s) upon which the selected block is dependent) (step 650), and specifies the program code for each block, for example, a portion of an existing control flow program (step 660). Although this description involves converting an existing control flow program for operation in a multiprocessor computer system using a data flow organization, those skilled in the art will recognize that the tool 522 may also be used to develop new data flow programs for execution on a multiprocessor computer system.

After all of the blocks have been processed (steps 640 to 660), the developer establishes the dependency relationships among the blocks by graphically linking them together (step 670). The tool 522 uses the graphical information to generate and store data reflecting the links. The blocks are then logically queued for processing in a multiprocessor computer system (step 680). The tool 522 uses the dependency/link information to queue the blocks in manner that reflects an appropriate order for processing. For example, any block(s) upon which a particular block is dependent may be placed in the queue before that particular block. For the example of FIGS. 2–4, the blocks may be queued in the manner shown in FIG. 7 with the blocks sharing the first state, i.e., (1,1), (2,1), (3,1), and (4,1), queued before the blocks with the second state, i.e., (1,2), (1,3), and (1,4), and followed by the blocks sharing the third state, i.e., (2,2), (2,3), (2,4), (3,2), (3,3), (3,4), (4,2), (4,3), and (4,4).

Multiprocessor Program Execution

Figure 8:
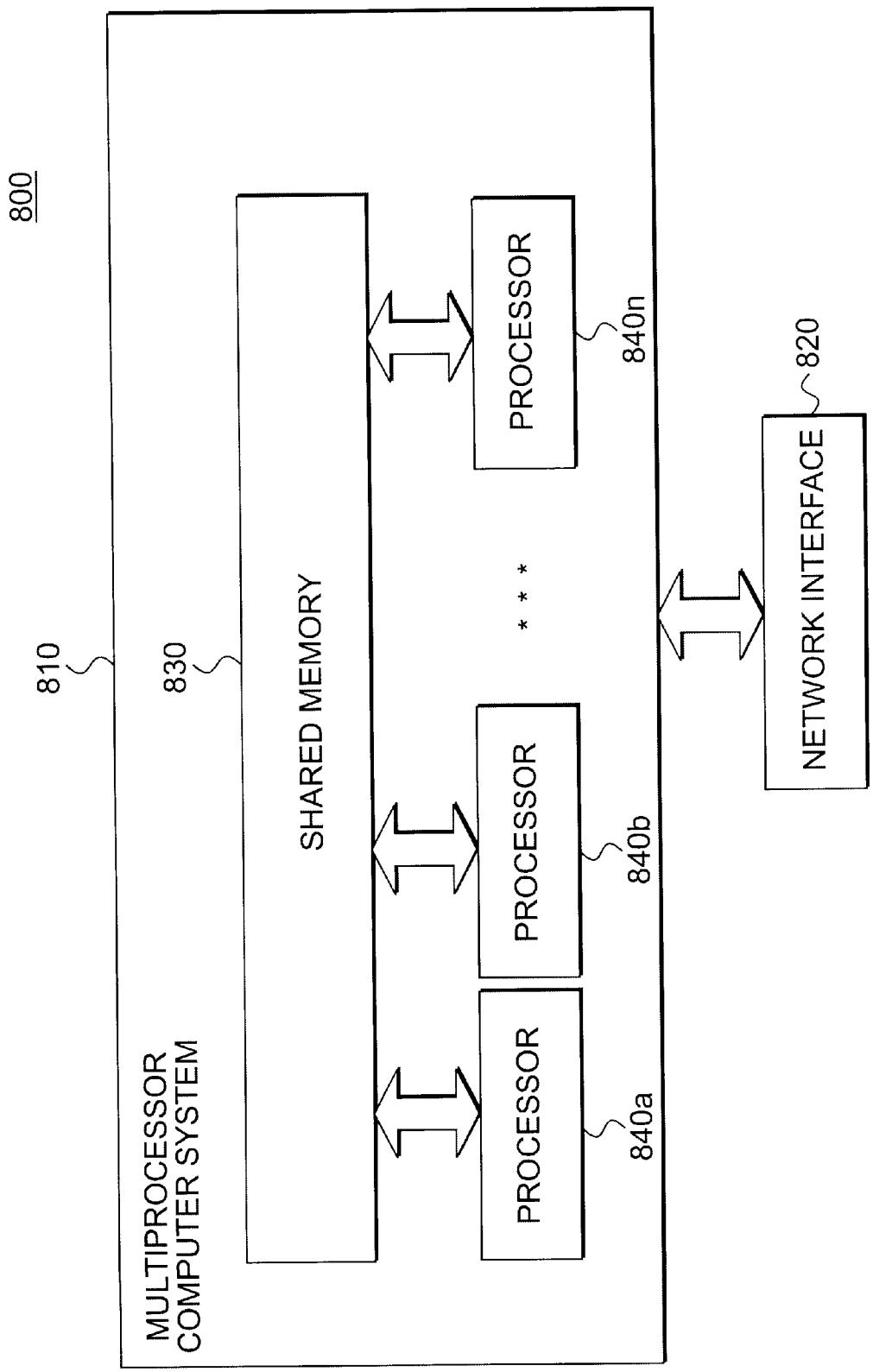
FIG. 8 depicts a block diagram of an exemplary multiprocessor computer system suitable for use with methods and systems consistent with the present.

As explained, in accordance with the present invention a data flow program is executed in a multiprocessor computer system. There are many configurations for such a multiprocessor computer system, one of which is illustrated in FIG. 8. For example, in a tightly coupled configuration, the multiple processors of a system may all be located in the same physical box. In an alternative, loosely coupled arrangement the system may be formed by multiple computers in a network, each computer having a separate processor.

Multiprocessor Computer System

As shown in FIG. 8, a multiprocessor computer system 810 is connected to a network interface 820, which enables a developer to transfer the data flow program from the development tool environment (e.g., FIG. 5) for execution in multiprocessor computer system 810. Alternatively, the data flow program development process in accordance with the principles of the present invention may be performed on system 810, which is also used for program execution. This alternative approach eliminates the need to transfer the program from a system used for development to a separate system used for program execution.

Multiprocessor computer system 810 comprises a single, shared memory 830 and multiple processors 840a, 840b, ... 840n. The number and type of processors is not critical to execution of the data flow program developed in accordance with the present invention. For example, an HPC Server with a multiple processor configuration may be used. The HPC Server is a product of Sun Microsystems, Inc. Processes execute independently on each of the processors and share memory 830. A process in this context may be a thread controlling execution of program code associated with a block of a data flow program developed using tool 522.

Process

Figure 9:
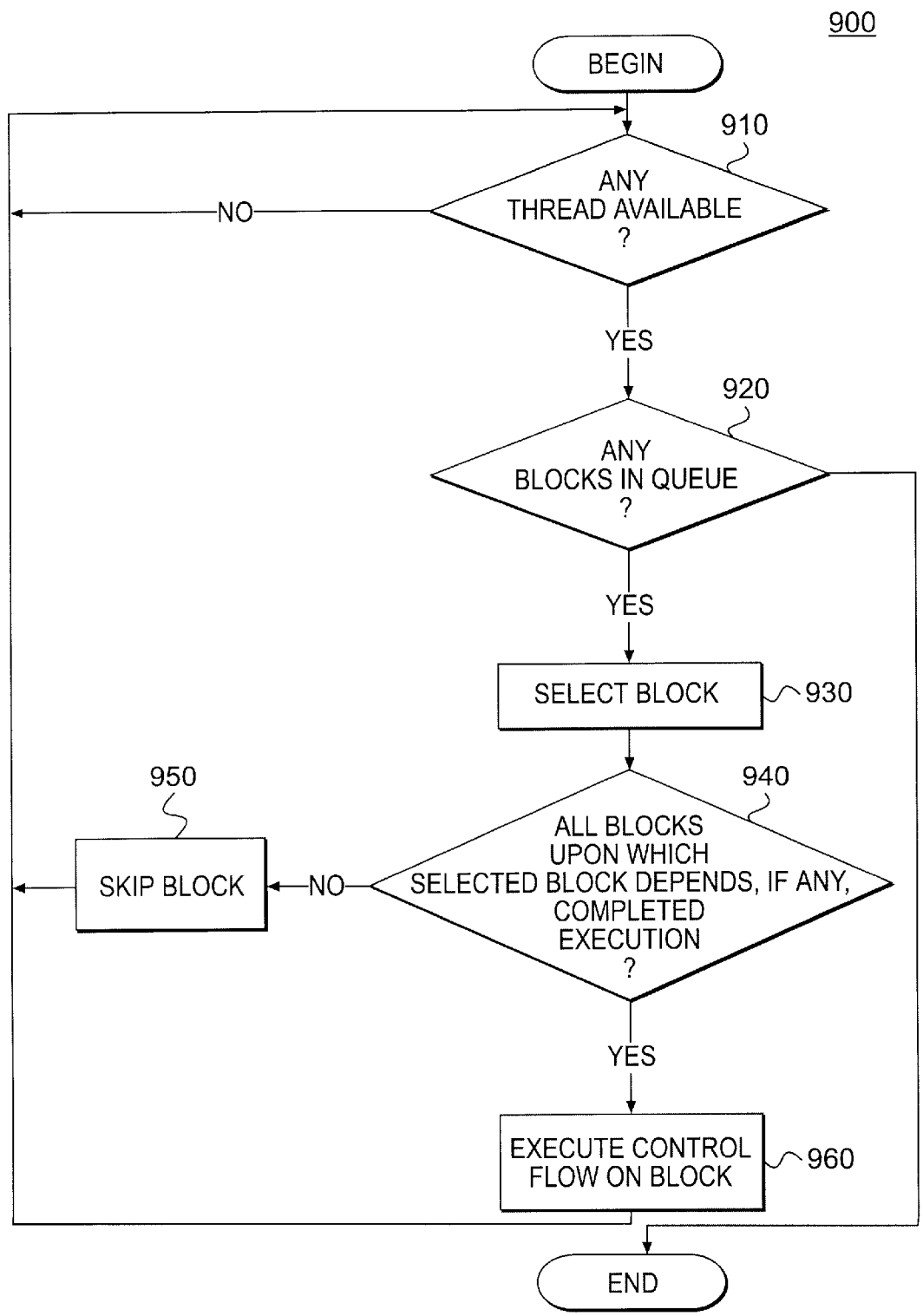
FIG. 9 depicts a flow chart of the operations performed during execution of a data flow program in accordance with the present invention.

The operation of a data flow program in accordance with the present invention will now be described with reference to process 900 of FIG. 9. Multiple threads are used to process the various components of a data flow program. Those skilled in the art will recognize that the number of threads is not important; the developer may specify any number, for example, one thread per processor, or the system may determine the number of threads based on the number of available processors and an analysis of the data flow program.

If a thread is available to process a block in accordance with its specified program code (step 910), the thread determines whether there are any blocks in the queue (step 920). If so, the available thread selects a block from the queue for processing (step 930). Typically, the blocks are selected from the queue based on the order in which they were placed in the queue. If, however, a thread determines that a selected block is dependent upon the execution of program code with respect to other block(s) that has/have not been executed (step 940), the thread skips the selected block (step 950). Otherwise, any block dependencies have been satisfied (step 940) and the thread uses an assigned processor to execute the program code associated with the block (step 960). Once the thread(s) processing a data flow program have dequeued all of the blocks in a queue awaiting processing (step 920), the process ends.

Figure 7:
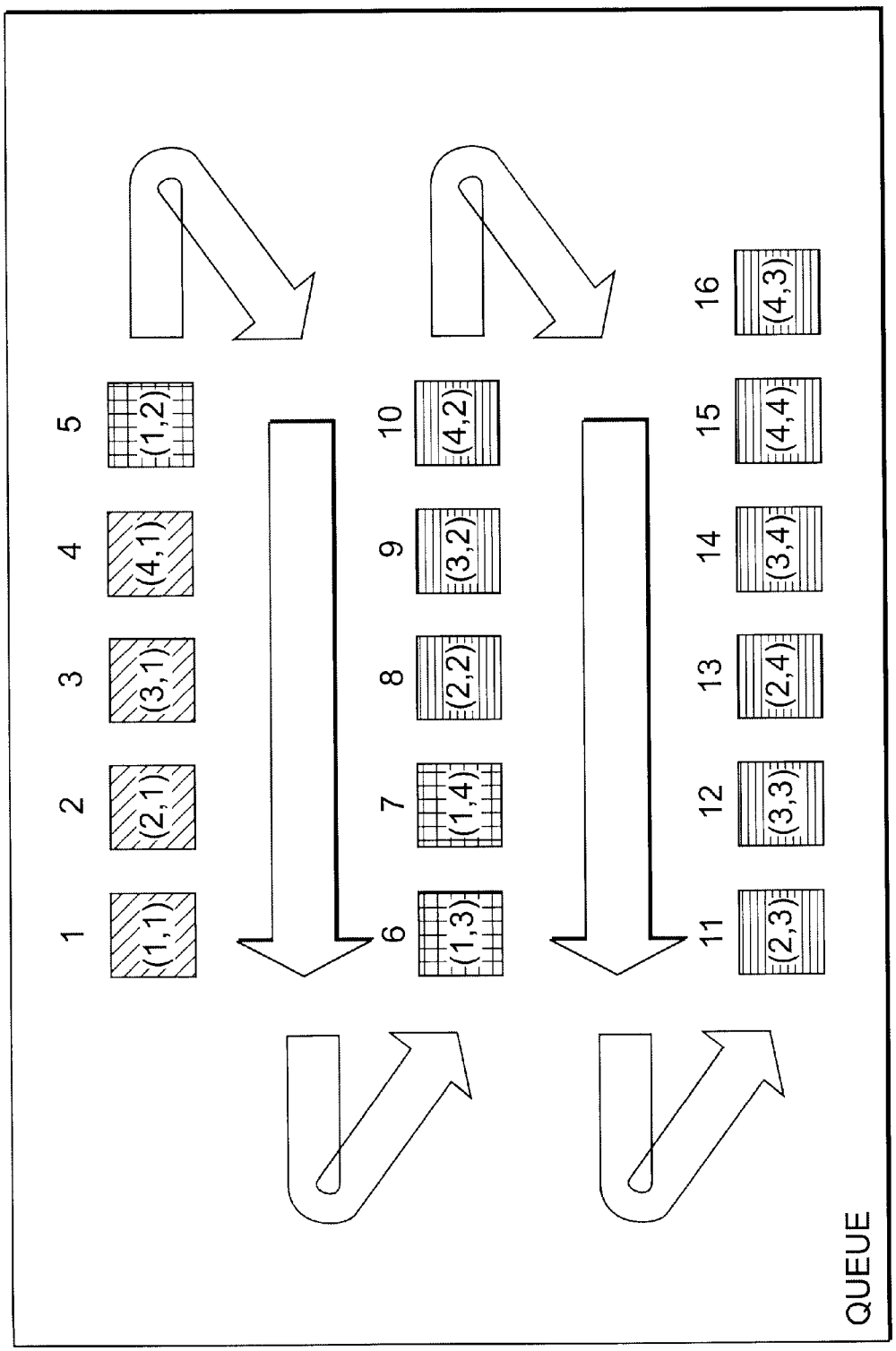
FIG. 7 depicts an example of a queue reflecting an order for execution of a data flow program in accordance with the present invention.
Figure 10A:
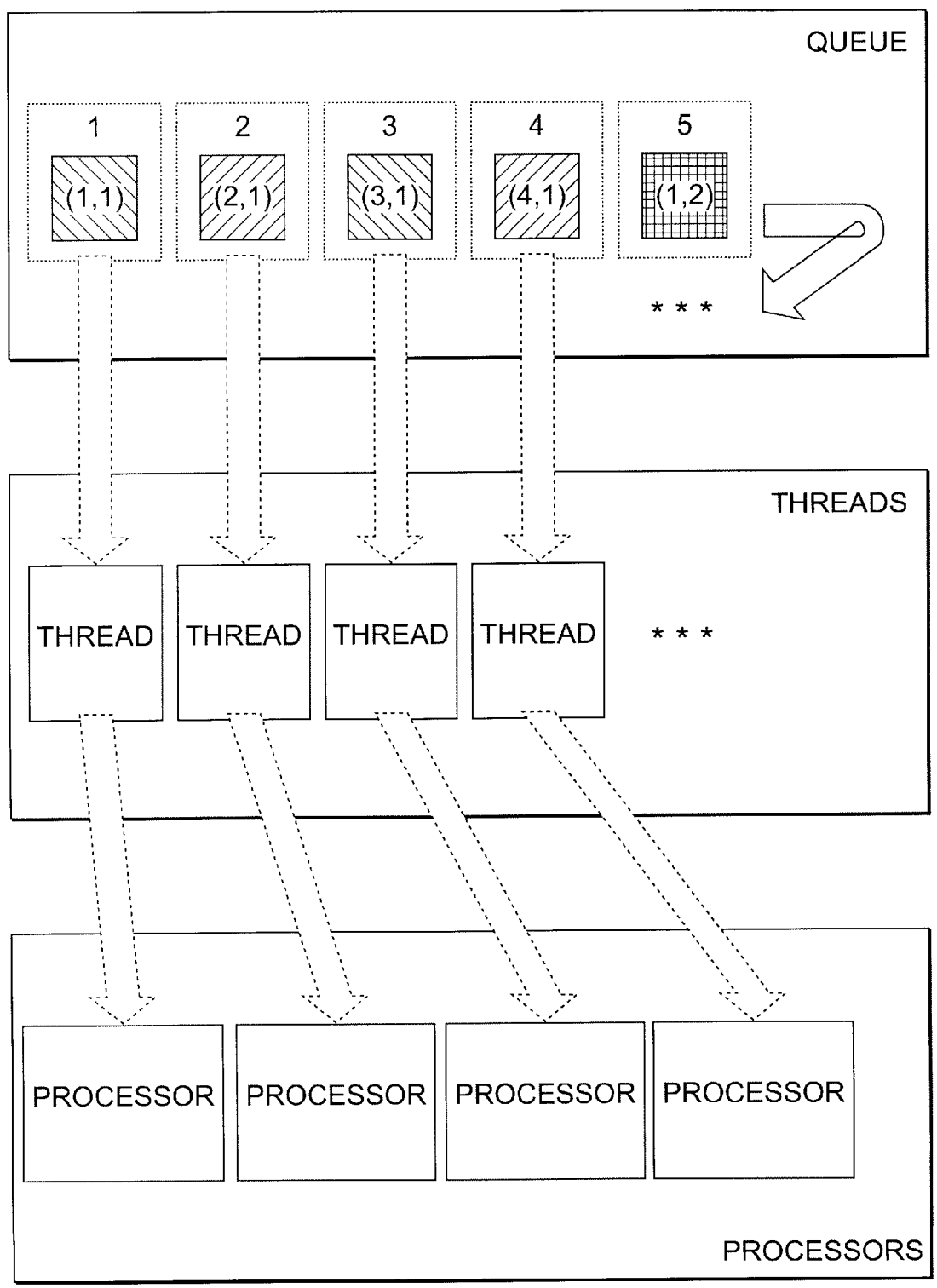
FIGS. 10A, 10B, and 10C depict block diagrams used to explain an execution cycle of a data flow program in accordance with the present invention.
Figure 10B:
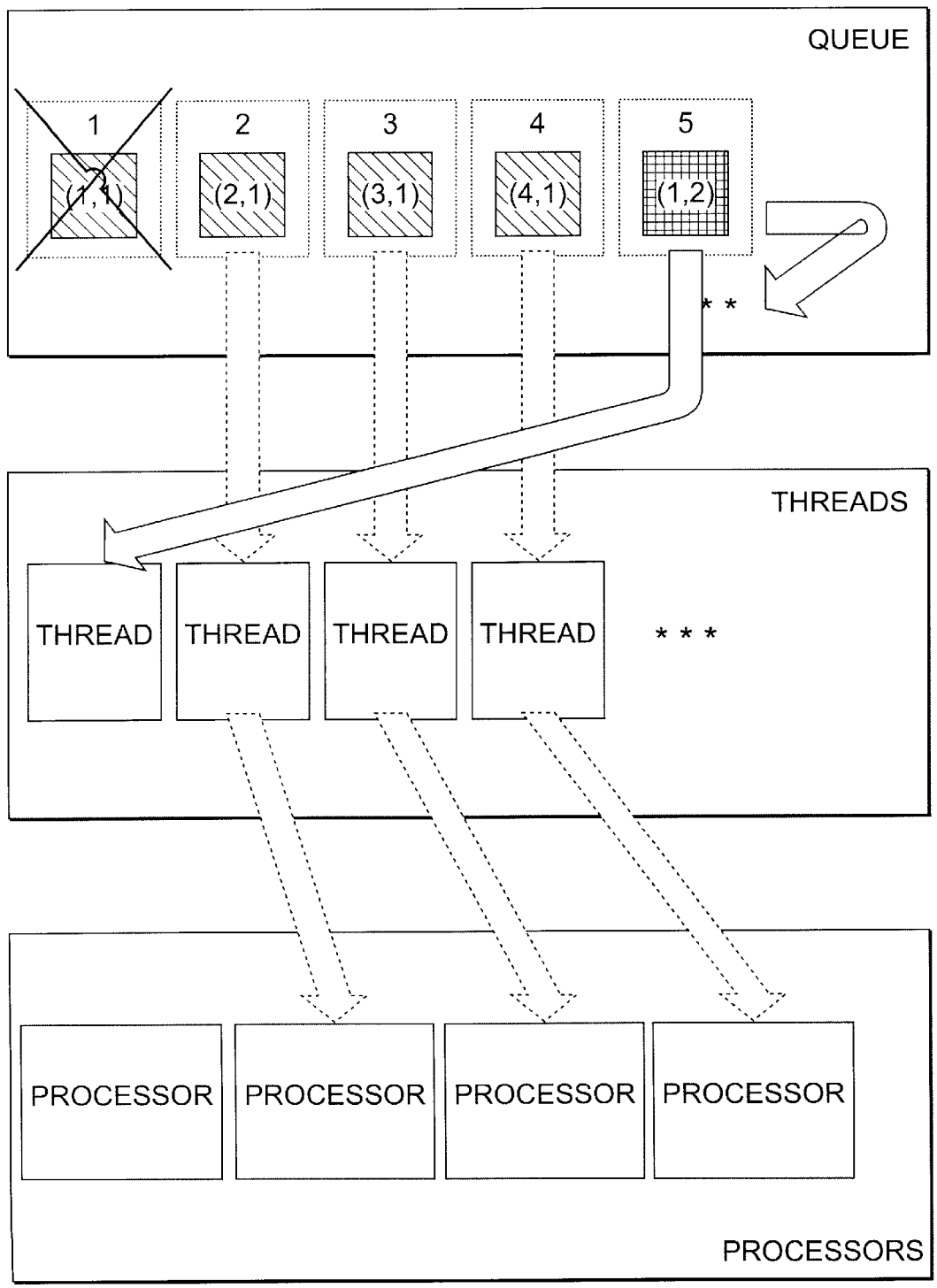
Figure 10C:
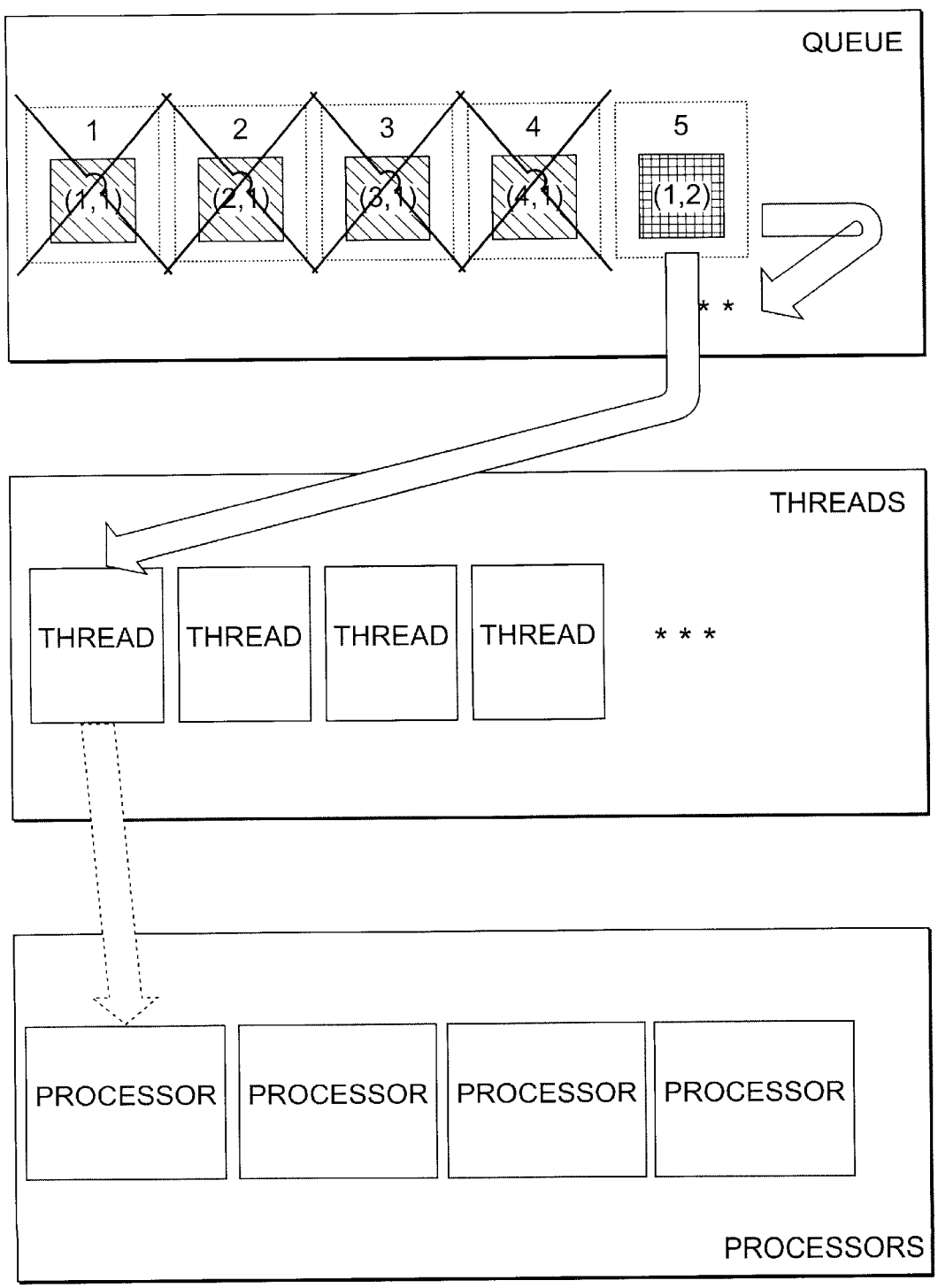

For purposes of illustrating the data flow program execution in accordance with process 900, FIGS. 10a–c illustrate a portion of the queue of FIG. 7, including the first five blocks of region 100 queued for processing. As shown in FIG. 10a, each thread processes a selected block using one of the processors. In this example, there are four threads and four processors. When a thread completes processing, as shown for example in FIG. 10b with one of the threads completing program execution of the block labeled (1,1), the thread attempts to execute the next available thread in the queue, in this case, the block labeled (1,2). However, the block labeled (1,2) is dependent upon the final state of other blocks still being executed, namely, blocks (2,1), (3,1), and (4,1). Once execution of the program code for all of these blocks has completed, as shown in FIG. 10c, a thread can continue processing with block (1,2). Those skilled in the art will recognize that, as opposed to remaining idle and, thus, not using computing resources efficiently, a thread may skip processing blocks in the queue and continue to process other queued blocks depending upon the dependency relationships associated with each block in the queue. Also, although FIG. 10 shows four threads and four processors, more or fewer threads or processors may be used depending upon the particular system configuration.

Optimization of Specifications by the User

The following description includes details on additional specifications the user may supply to optimize the data flow program.

Memory Region Specification Using the Tool

In one implementation, the memory regions may further be specified by the user by giving the tool 522 the following control flow variables and parameters:

Name: A unique name

Kind: Determine whether the memory region is an input to the problem, an output, input and output, or temporary space used only during evaluation of the problem.

Type: Corresponds to the control flow data type of the elements of the memory region, i.e., integer, real, etc.

Dimensions: 0 for a scalar, 1 for a vector, 2 for a matrix. Higher dimensions may also be used.

Size: A size for each dimension of the memory region.

Grid: A size for each dimension of the blocks in a memory region.

Leading dimension: The size of the first dimension of matrices (when a memory region is larger than the matrix it holds).

Macros for the Program Code

It is also useful for the control flow program code that performs operations on the blocks to be able to access and manipulate the elements of a block. Macros are supplied that allow the user to write the program code in control flow format that will perform operations on the blocks at each node in the DAG. The macros are used in the program code to access specific elements and attributes of a block in a memory region. Taking a block in a memory region as an argument, the macro may return for instance, the number of rows or columns in the block, or the number of rows or columns in the memory region. The following table lists several exemplary macros that the user can insert into program code and that will act on a block in a memory region:

| Macro | Description |
| --- | --- |
| #AROW(OBJ) | evaluates to the absolute row of the first element in the block, the true index |
| #ACOL(OBJ) | evaluates to the absolute column of the first element in the block |
| #NROWS(OBJ) | the number of rows in the block |
| #NCOLS(OBJ) | the number of columns in the block |
| #ANROWS(OBJ) | the number of rows of elements in the memory region |
| #ANCOLS(OBJ) | the number of columns of elements in the memory region |
| #GROWS(OBJ) | the number of rows of elements per block |
| #GCOLS(OBJ) | the number of columns of elements per block |
| #RECROW (OBJ,INDEX) | converts INDEX, and absolute index based on the current level of recursion and converts it to a true absolute index |
| #RECCOL (OBJ,INDEX) | converts INDEX, and absolute index based on the current level of recursion and converts it to a true absolute index |

Figure 11:
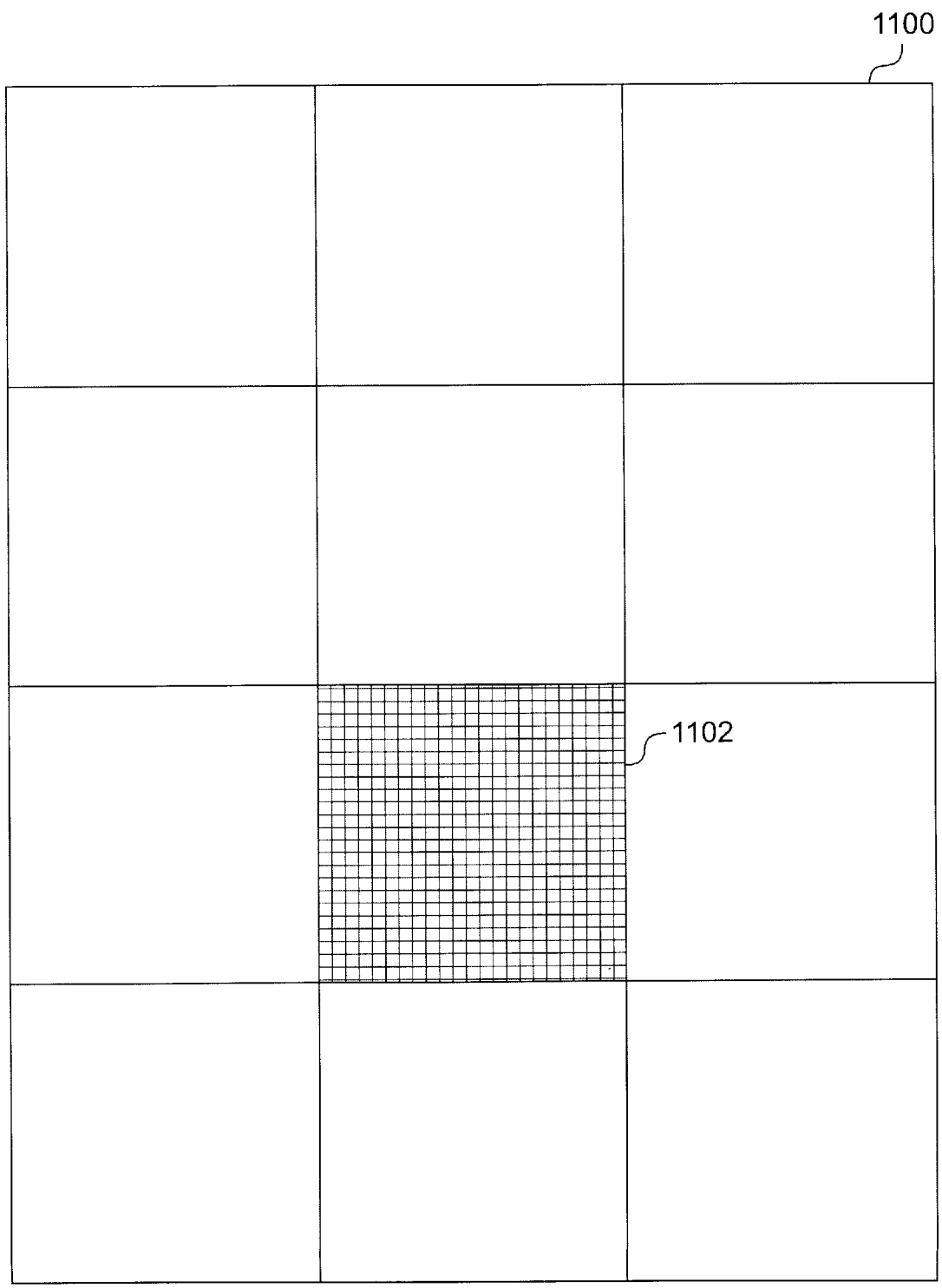
FIG. 11 is an exemplary memory region containing a block containing elements consistent with the present invention.

FIG. 11 shows an exemplary memory region 1100 with blocks having elements arranged in a 10×10 fashion. Given this memory region 1100 with a block 1102 located as shown on the figure, the following macros evaluate for this block 1102 as shown in the following table:

| Macro | Value |
| --- | --- |
| #ROW(A) | 3 |
| #COL(A) | 2 |
| #AROW(A) | 21 |
| #ACOL(A) | 11 |
| #NROWS(A) | 10 |
| #NCOLS(A) | 10 |
| #ANROWS(A) | 40 |
| #ANCOLS(A) | 40 |
| #GROWS(A) | 10 |
| #GCOLS(A) | 10 |

It should be noted that recursive program codes may be used in which the process repeatedly applies over a smaller region. In this case, the recursion stops when a base case is reached and the region becomes so small that there is not enough left to repeat the process. Specific program code can be associated with a recursive process that will only be executed for the base case. For example, assume that a recursive process is defined that moves over one block column and down one block row at each level of recursion. The following recursive macros would evaluate at each level as shown in the following table:

| | Recursive Level | | |
| --- | --- | --- | --- |
| Macro | Level 1 | Level 2 | Level 3 |
| #RECROW(A,1) | 1 | 11 | 21 |
| #RECCOL(A,6) | 6 | 16 | 26 |

Additionally, program code can be designated as sub-DAG program code which signifies that nodes made for the program code will be replaced by a sub-DAG. This allows for a hierarchical structure of DAGs to be built.

Dependencies

As stated previously, dependencies are specified between blocks and denote which blocks require execution before other blocks, and these dependencies, in turn, determine the connections between nodes in a DAG representing execution order. Often, several blocks in a memory region depend on several other blocks in the same memory region. For ease of specifying dependencies between a set of blocks such as those in a state, the tool 522 provides an option for the user to quickly denote dependencies between multiple blocks.

Figures 12A, 12B, 12C, 12D:
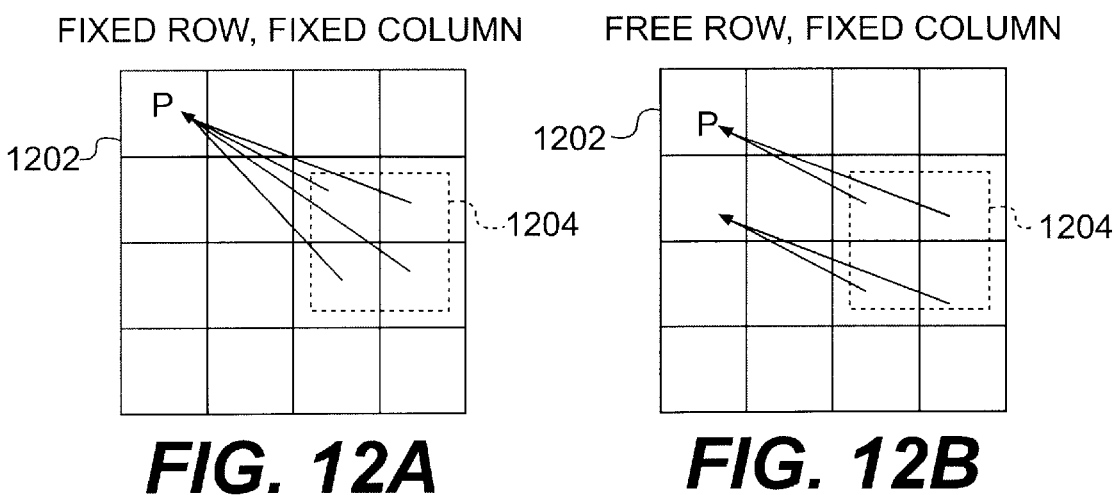
FIGS. 12A, 12B, 12C, and 12D illustrate the creation of dependencies between sets of blocks consistent with the present invention.

FIG. 12A shows a user denoting a parent block 1202 for a set of blocks 1204 (or state) using a user interface in accordance with an implementation of the present invention. In this implementation, the parent block 1202 represents the starting upper left corner of a set of parent blocks to be designated. Then the user specifies whether the dependency on this parent block 1202 is fixed or free with respect to row and column. FIGS. 12B–D illustrate the different combinations of these designations given an exemplary dependent set of blocks 1204. If the user designates the dependency as fixed, all blocks in the dependent set of blocks 1204 depend on the processing of that one parent block 1202 (FIG. 12A). If it is free with respect to row, the block that is depended on varies as row location in the dependent set of blocks 1204 varies (from the upper left block) (FIG. 12B). Similarly, if the dependency is free with respect to column, the block that is depended on varies as column location in the dependent set of blocks 1204 varies (from the upper left block) (FIG. 12C). If the dependency is free with respect to row and column, the block that is depended on varies as location in the dependent set of blocks varies (FIG. 12D). Through this method of designating dependencies, the tool 522 allows a user to more easily designate multiple block dependencies.

Distributions

The tool 522 permits the user to assign "distributions" to sets of blocks in a memory region and these distributions control the manner in which blocks are assigned to nodes in a DAG. These distributions can be used to flexibly group different blocks into a single node and consequently can allow different parallel processing schemes to be used for execution of a problem. For example, given that the result of a 3×3 matrix multiply problem is a 3×3 matrix, the user may want 9 threads to operate on 9 nodes, one for each value in the resulting matrix. However, the user may want 3 threads to process 3 nodes, one for each column in the resulting matrix. In this latter case, the node will contain more blocks to be operated on but will require less threads. The varying distributions give the user flexibility in selecting the parallel processing schemes.

To designate a distribution, the user selects a rectangular area of the memory region identifying a set of blocks. In addition to determining the allocation of blocks to nodes, the distributions also control which blocks macros may operate on. There are two main categories of distributions: primary and secondary. The difference between primary and secondary distributions is that macros may only operate on blocks in primary distributions; they do not operate on blocks in secondary distributions. Additionally, each memory region may have only one primary distribution, and this distribution determines how many nodes there will be in the DAG for the problem.

In secondary distributions, if during processing, one block in the distribution is added to a node, other blocks in that distribution are also added to the same node. This further facilitates the specification of dependencies.

Distributions also fall into one of several categories: primary single, secondary "multiple row," secondary "multiple column," secondary "all," and "multiple" (either primary or secondary).

Primary single distributions control how many DAG nodes are created. If a primary single distribution is present in a memory region, one DAG node will be created for each block in the distribution. Each block in a primary single distribution will enter its own node; no two blocks of a given primary single distribution will share the same node. If there is more than one primary single distribution present for a problem, i.e., one in each of two or more memory regions, they must be the same size and shape because each one will have one block entered into each DAG node.

For all other types of distributions, to determine which block in the distribution is added to a node with a primary single distribution block, the distribution is visually laid over the primary single distribution. The block over the primary single distribution block is added to the node containing the primary single distribution block under it. As described below, for secondary distributions, other blocks associated with that block are also be added to the same node.

The three types of exclusively secondary distributions have blocks that may not be accessed by macros in the program code that operates on the blocks. These distributions are secondary multiple row, secondary multiple column, and secondary all distributions. If a block in a secondary multiple row distribution is added to a node, then all of the blocks in the row of that block are also added to the node. Secondary multiple column distributions work in the same way except that entire column is added instead of a row. In secondary all distributions, when a block in the distribution is added to a node, every block in the distribution is added to the node.

Multiple distributions can be primary or secondary; the blocks in the distribution may be accessed by macros if primary. If the primary single distribution is larger than the multiple distribution, the multiple distribution is laid over each section of the primary distribution repeatedly until it has eventually covered the whole thing. At each iteration, whichever block of the multiple distribution is over a block in the single primary distribution, that block is entered into the same node that contains the block of the single primary distribution below it.

Distributions can also have a transpose attribute. This indicates that the associated distribution is transposed before the overlaying process is applied. This cannot apply to primary single distributions and has no effect on "all" distributions.

Figure 13:
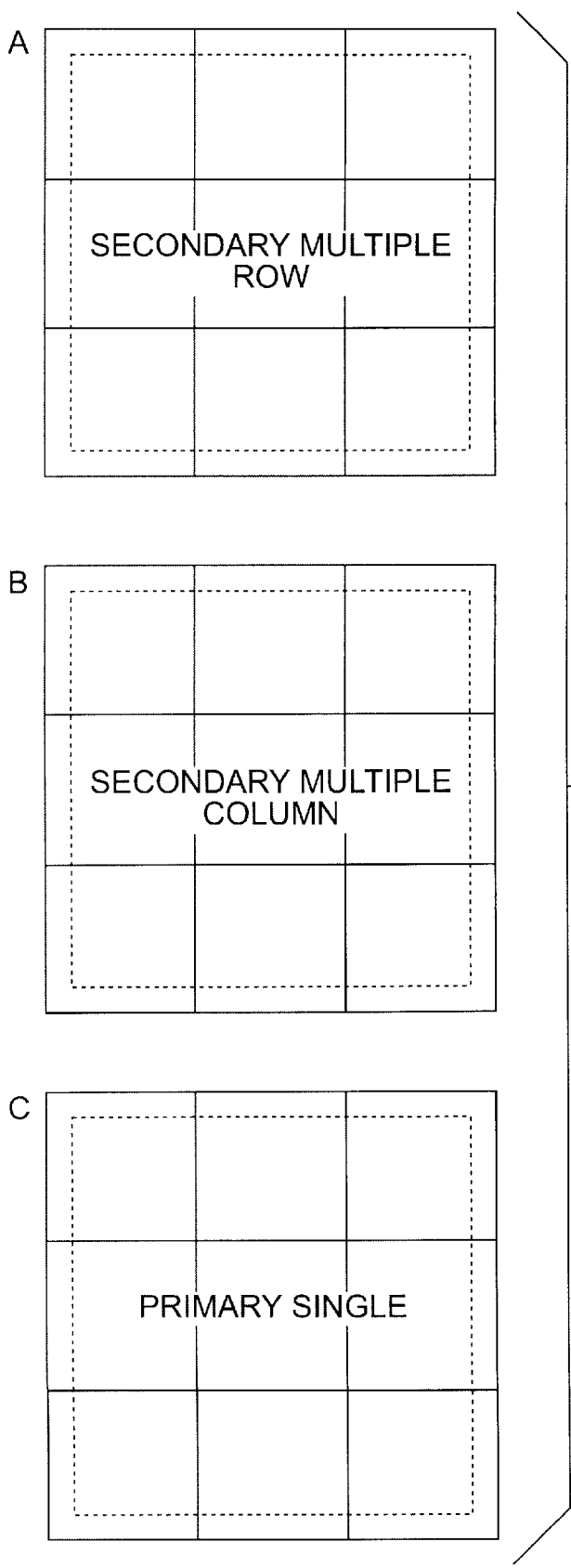
FIGS. 13–16 each show three exemplary memory regions having blocks assigned to distribution groups consistent with the present invention.

FIG. 13 shows exemplary memory regions used in a matrix multiply problem. As an example, consider a problem of a matrix multiply involving three 2-dimensional memory regions, A, B, and C. Assume that each memory region has row and column sizes such that the memory regions are divided into square blocks as shown in FIG. 13. The operation A*B=C can be performed in parallel using several different schemes. First, consider a scheme in which each block of C can be written by a different thread. A block in C is formed by multiplying the blocks in the corresponding row of A by the corresponding column of blocks in B. In this example, the dashed lines represent the distributions created by the user.

For the 3×3 case depicted in FIG. 13, since C has a primary single distribution, and thus a one-to-one correspondence between blocks in the distribution and nodes in the DAG, 9 nodes would be created in the DAG, one for each block in C. The secondary multiple row distribution on A and the multiple column distribution on B would add the appropriate rows of A and columns of B to each node. For example, when the C(1,1) block is added to the node, the A(1,1) and B(1,1) blocks are also added. Since the A(1,1) block is secondary multiple row, all of the blocks in that row are also added to the same node, and since the B(1,1) block is secondary multiple column, all of the blocks in that column are added to the same node, and so on.

The resulting nodes created are shown in the table below. In the table, the ordered pair specifies the row and column of each block added, and the hyphen ("–") specifies a range of rows or columns when more than one block is added from a distribution.

| Node | Blocks Added |
|---|---|
| Node 1 | C(1,1), A(1,1–3), B(1–3,1) |
| Node 2 | C(1,2), A(1,1–3), B(1–3,2) |
| Node 3 | C(1,3), A(1,1–3), B(1–3,3) |
| Node 4 | C(2,1), A(2,1–3), B(1–3,1) |
| Node 5 | C(2,2), A(2,1–3), B(1–3,2) |
| Node 6 | C(2,3), A(2,1–3), B(1–3,3) |
| Node 7 | C(3,1), A(3,1–3), B(1–3,1) |
| Node 8 | C(3,2), A(3,1–3), B(1–3,2) |
| Node 9 | C(3,3), A(3,1–3), B(1–3,3) |

Being primary, information about the C block in each node can be obtained in the code through the use of the macros. However, the A and B blocks cannot be accessed by macros since their distributions are secondary.

Figure 14:
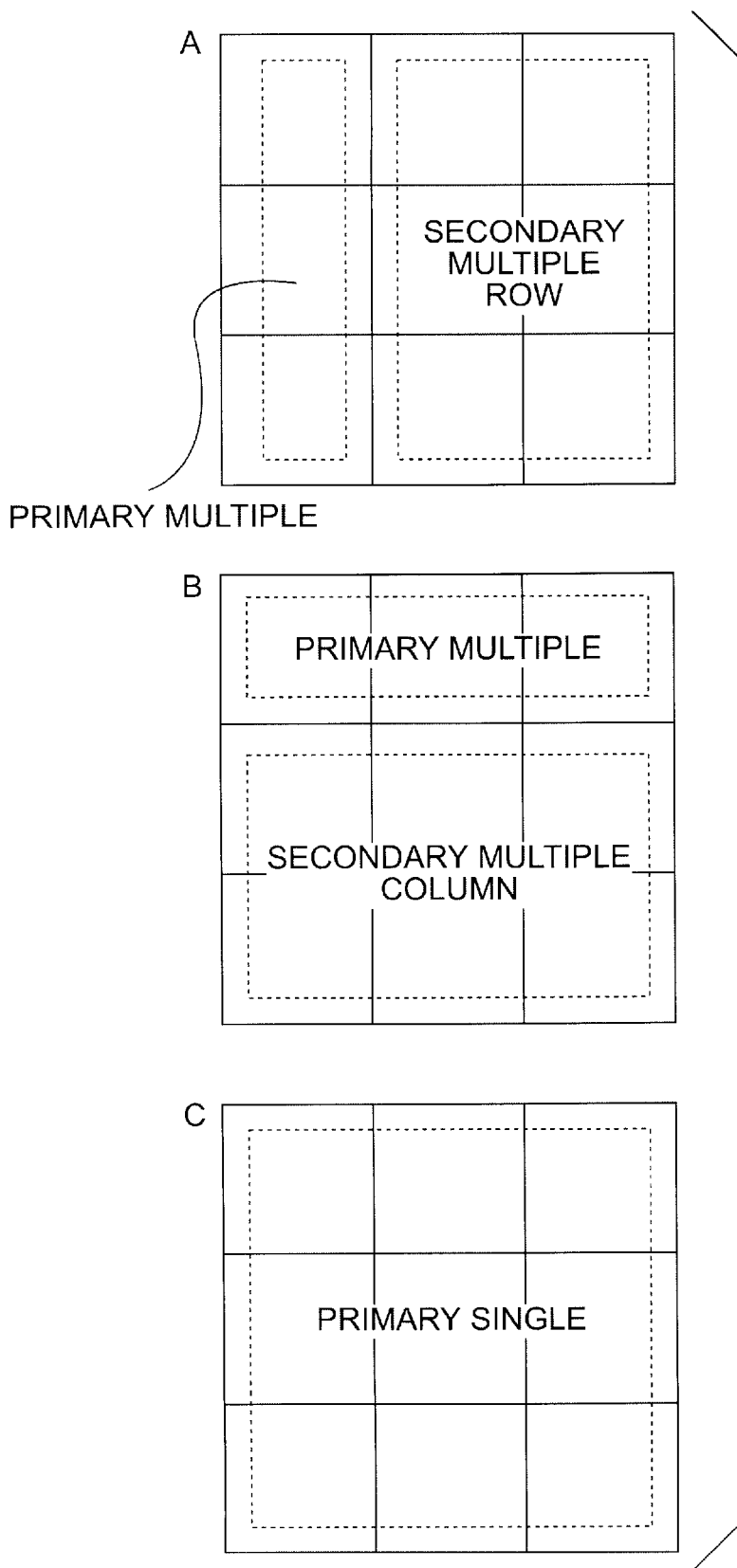

FIG. 14 shows primary A and B distributions created for the same matrix multiply problem. The same blocks of A, B, and C are associated with each node, but there are now primary blocks of A and B that can be accessed with a macro. This implementation results in the following 9 nodes:

| Node | Blocks Added |
|---|---|
| Node 1 | C(1,1), A(1,1), B(1,1), A(1,2–3), B(2–3,1) |
| Node 2 | C(1,2), A(1,1), B(1,2), A(1,2–3), B(2–3,2) |
| Node 3 | C(1,3), A(1,1), B(1,3), A(1,2–3), B(2–3,3) |
| Node 4 | C(2,1), A(2,1), B(1,1), A(2,2–3), B(2–3,1) |
| Node 5 | C(2,2), A(2,1), B(1,2), A(2,2–3), B(2–3,2) |
| Node 6 | C(2,3), A(2,1), B(1,3), A(2,2–3), B(2–3,3) |
| Node 7 | C(3,1), A(3,1), B(1,1), A(3,2–3), B(2–3,1) |
| Node 8 | C(3,2), A(3,1), B(1,2), A(3,2–3), B(2–3,2) |
| Node 9 | C(3,3), A(3,1), B(1,3), A(3,2–3), B(2–3,3) |

The program code that executes on each node may be represented by a FORTRAN function, MATRIX_MULTIPLY, that takes as arguments the location, number of rows, and number of columns of the three matrices A, B, and C, respectively.

| | |
|---|---|
| CALL MATRIX_MULTIPLY | (A(#AROW (A),1),#NROWS(A), #ANCOLS (A), |
| $ | B(1,#ACOL(B)),#ANROWS(B), #NCOLS(B), |
| $ | C(#AROW(C),#ACOL(C)), #NROWS(C), #NCOLS(C)) |

Figure 15:
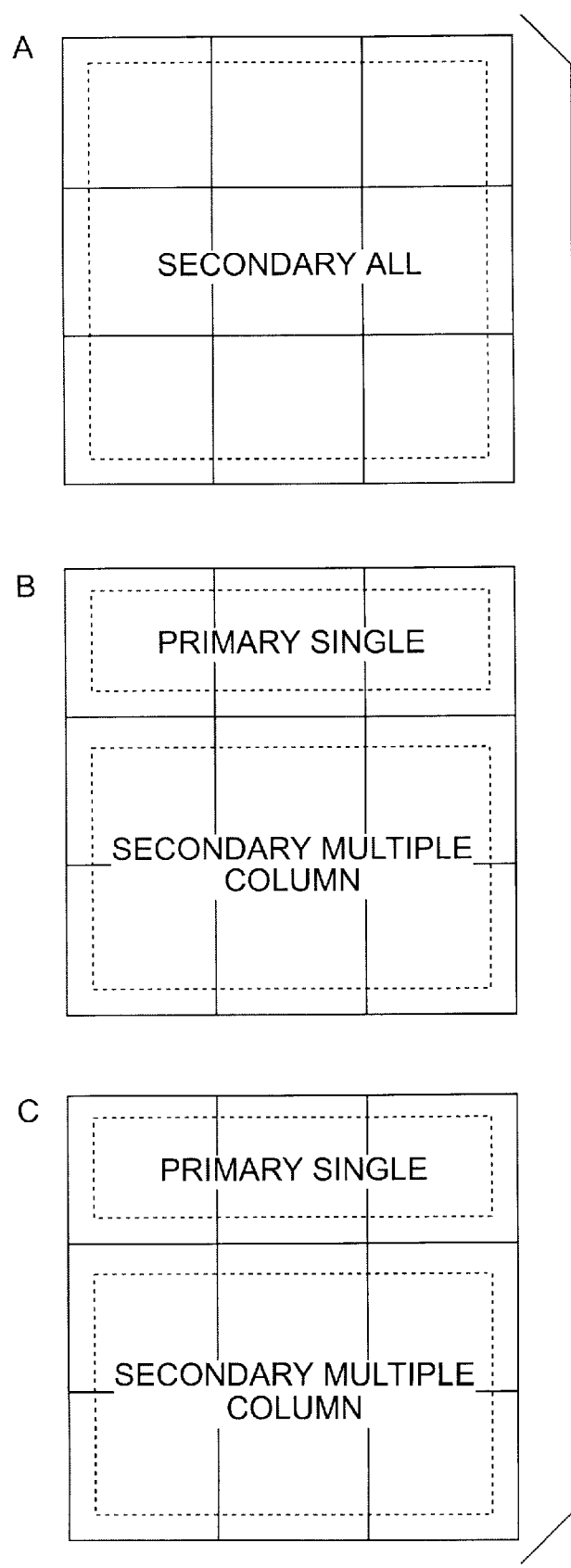

FIG. 15 shows another possible matrix multiply scheme in which each thread would process a column of blocks in C. This would be accomplished by the distributions shown in FIG. 15. In this case, only three nodes are created because there are three blocks in the primary single distribution. When the multiple column distributions are laid over the primary single distribution, each block over a primary single distribution block is added to the same node as the primary distribution block, along with the other block in the same column of the multiple column distribution. In this example, for the secondary multiple column distribution of B, B(2,1) lays over C(1,1) and is added to the node containing C(1,1). Because it's a multiple column distribution, the block B(2,2) in the same column as B(2,1) is also added to the same node. Also note that when a block from A is added to a node, all blocks from A are added to that node due to its secondary all distribution.

| Node | Blocks Added |
|---|---|
| Node 1 | C(1,1), B(1,1), A(1–3,1–3), C(2–3,1), B(2–3,1) |
| Node 2 | C(1,2), B(1,2), A(1–3,1–3), C(2–3,2), B(2–3,2) |
| Node 3 | C(1,3), B(1,3), A(1–3,1–3), C(2–3,3), B(2–3,3) |

Use of this scheme requires that the program code be rewritten as shown below:

| | |
|---|---|
| CALL MATRIX_MULTIPLY | (A(1,1),#ANROWS(A),#ANCOLS(A), |
| $ | B(1,#ACOL(B)),#ANROWS(B), #NCOLS(B), |
| $ | C(1,#ACOL(C),#ANROWS(C), #NCOLS(C)) |

Figure 16:
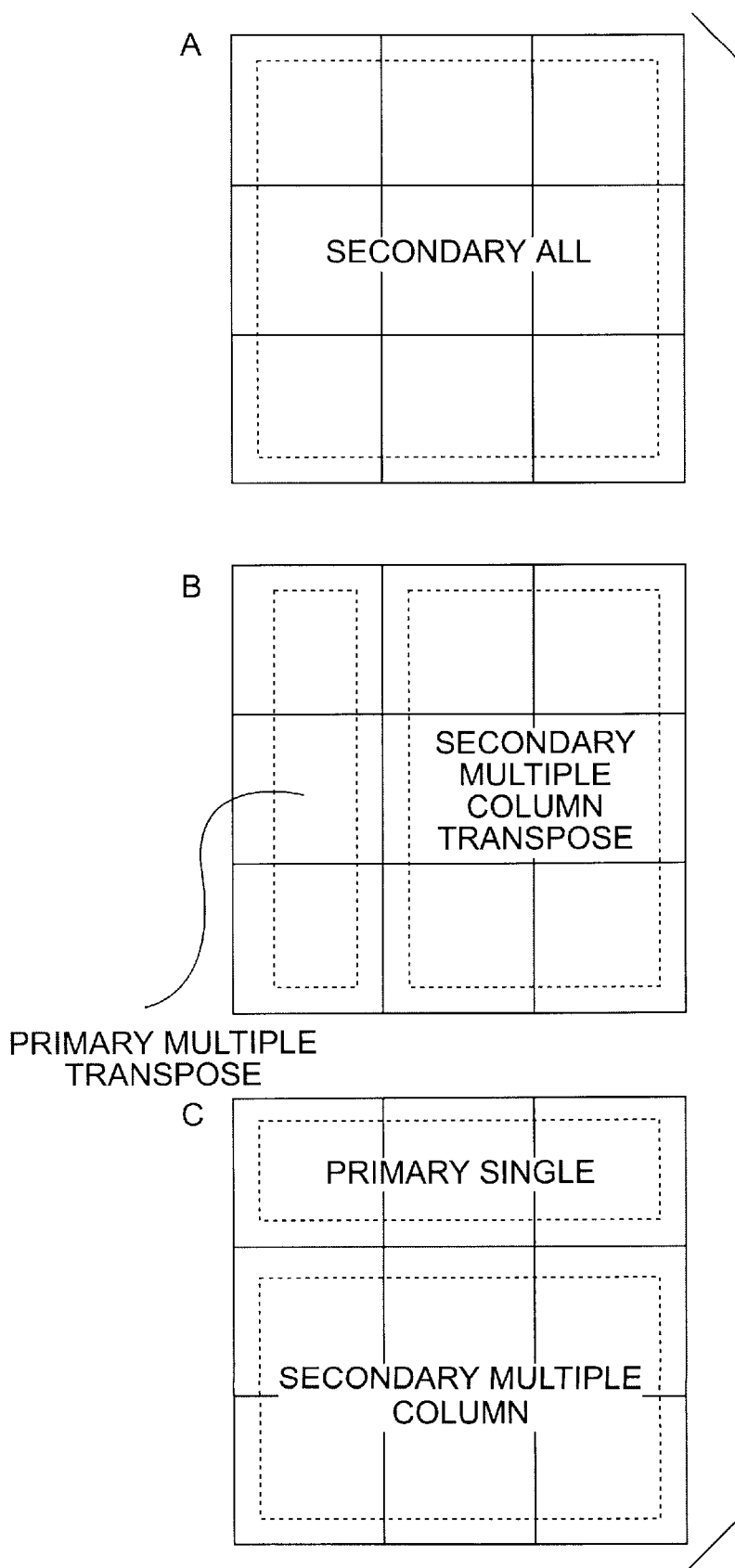

FIG. 16 shows a slightly different example where A is to be multiplied by the transpose of B to form C. The use of the transpose attribute allows the scheme from the previous example to be used with only slight modifications.

Conclusion

Methods, systems, and articles of manufacture consistent with the present invention thus enable developer to easily develop data flow programs and to convert existing control flow programs according to the data flow model. By permitting developers to define memory regions and divide them into blocks with corresponding states (each related to particular control flow program instructions), the interface facilitates the development of a data flow program for execution in a multiprocessor environment. Although components of the program utilize the control flow programming method, the program as a whole is designed using a data flow approach. Additionally, each block contains a set of data, meaning that the program code associated with each block does not necessarily operate on scalars or single data items. This makes the present approach more useful for data-intensive programming systems that require significant data processing in which components can be easily processed in parallel on a multiprocessor computer system.

Also, methods consistent with the present invention are applicable to all programs for execution in a multiprocessor system regardless of the computer programming language. For example, Fortran 77 is a programming language commonly used to develop programs for execution by multiprocessor computer systems.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The invention may be implemented with both object-oriented and non-object-oriented programming systems. The scope of the invention is defined by the claims and their equivalents.

What is claimed is:

1. A method for executing a control flow program based on a data flow model in a multiprocessor computer system, comprising:

receiving instructions defining a memory region divided into multiple blocks, wherein each block is formed of a set of values associated with a function;

receiving instructions defining sets of the blocks, each block in a set having a state reflected by a designated portion of the control flow program that when executed transforms the values forming the block based on the function;

receiving instructions assigning sets of blocks to distribution groups that determine how the blocks are processed in parallel;

storing any dependencies among the blocks, each dependency indicating a relationship between two sets of blocks and requiring the portion of the control flow program associated with a first set of blocks of the relationship to be executed before the portion of the control flow program associated with a second set of blocks of the relationship; and selecting the blocks from the multiple blocks for execution of the corresponding, designated portions of the control flow program based on the stored dependencies and the assigned distribution groups.

2. The method of claim 1, further comprising:

providing code that allows a user to create control flow program code that accesses the values, in a block in the memory region.

3. The method of claim 2, wherein providing code, comprises:

determining whether the provided code can access the values in a block based on the distribution group to which the block is assigned.

4. The method of claim 1, wherein the distribution groups determine how the blocks are processed in parallel by determining how the blocks are added to nodes in a directed acyclic graph that represents the processing execution order for the blocks.

5. The method of claim 1, wherein storing any dependencies among the blocks, comprises:

determining that the second set of blocks depends on a result of the execution of the portion of the control flow program associated with the first set of blocks.

6. The method of claim 1, wherein storing any dependencies among the blocks, comprises:

receiving an indication of a first set of blocks to be dependent upon a second set of blocks:, receiving an indication of a single parent block to represent the second set of blocks upon which the first set of blocks depend; and determining the remaining blocks in the second set of blocks based on the indicated single parent block.

7. The method of claim 6, wherein the remaining blocks in the second set of blocks are adjacent to the single parent block.

8. A data processing system containing a development tool that displays a user interface for developing a data flow program, the user interface comprising:

a first view configured to receive instructions defining a region and dividing the region into multiple blocks, each block defining a set of values associated with a function;

a second view configured to receive instructions defining sets of the blocks, each block in a set having a state reflected by a designated portion of the program that when executed transforms the values forming the block based on the function;

a third view configured to receive information assigning blocks to distribution groups that determine how the blocks are processed in parallel; and a fourth view configured to receive information reflecting any dependencies among the blocks, each dependency indicating a relationship between two sets of blocks.

9. The graphical user interface of claim 8, wherein a dependency relationship between two sets of blocks requires the portion of the program associated with one of the two sets of blocks to be executed before the portion of the program associated with the other set of blocks.

10. A method for executing a program in a multiprocessor computer system, comprising:

receiving instructions defining a memory region divided into multiple blocks, wherein each block is formed in a set of values associated with a function;

receiving instructions defining sets of the blocks, each block in a set having a state reflected by a designated portion of the control flow program that when executed transforms the values forming the block based on the function;

receiving instructions assigning sets of blocks to distribution groups that determine how the blocks are processed in parallel;

storing any dependencies among the blocks, each dependency indicating a relationship between two sets of blocks and requiring the portion of the control flow program associated with a first set of blocks of the relationship to be executed before the portion of the control flow program associated with a second set of blocks of the relationship; and selecting the blocks from the multiple blocks for execution of the corresponding, designated portions of the control flow program based on the stored dependencies and the assigned distribution groups.

11. An apparatus for executing a program, comprising:

means for receiving instructions defining a memory region divided into multiple blocks, wherein each block is formed of a set of values associated with a function;

means for receiving instructions defining sets of the blocks, each block in a set having a state reflected by a designed portion of the control flow program that when executed transforms the values forming the block based on the function;

means for receiving instructions assigning sets of blocks to distribution groups that determine how the blocks are processed in parallel;

means for storing any dependencies among the blocks, each dependency indicating a relationship between two sets of blocks and requiring the portion of the control flow program associated with a first set of blocks of the relationship to be executed before the portion of the control flow program associated with a second set of blocks of the relationship; and means for selecting the blocks from the multiple blocks for execution of the corresponding, designated portions of the control flow program based on the stored dependencies and the assigned distributed groups.

12. A computer-readable medium containing instructions for controlling a data processing systems to perform a method, the method comprising the steps of:

receiving instructions defining a memory region divided into multiple blocks, wherein each block is formed of a set of values associated with a function;

receiving instructions defining sets of the blocks, each block in a set having a state reflected by a designated portion of the control flow program that when executed transforms the values forming the block based on the function;

receiving instructions assigning sets of blocks to distribution groups that determine how the blocks are processed in parallel;

storing any dependencies among the blocks, each dependency indicating a relationship between two sets of blocks and requiring the portion of the control flow program associated with a first set of blocks of the relationship to be executed before the portion of the control flow program associated with a second set of blocks of the relationship; and selecting the blocks from the multiple blocks for executing of the corresponding, designated portions of the control flow program based on the stored dependencies and the assigned distributed groups.

13. The computer-readable medium of claim 12, wherein the method further comprises:

providing code that allows a user to create control flow program code that accesses the values in a block in the memory region.

14. The computer-readable medium of claim 13, wherein providing code, comprises:

determining whether the provided code can access the values in a block based on the distribution group to which the block is assigned.

15. The computer-readable medium of claim 12, wherein the distribution groups determine how the blocks are processed inparallel by determining how the blocks are added to nodes in a directed acyclic graph that represents the processing execution order for the blocks.

16. The computer-readable medium of claim 12, wherein storing any dependencies among the blocks, comprises:

determining that the second set of blocks depends on a result of the execution of the portion of the control flow program associated with the first set of blocks.

17. The computer-readable medium of claim 12, wherein storing any dependencies among the blocks, comprises:

receiving an indication of a first set of blocks to be dependent upon a second set of blocks;

receiving an indication of a single parent block to represent the second set of blocks upon which the first set of blocks depend; and determining the remaining blocks in the second set of blocks based on the indicated single parent block.

18. The computer-readable medium of claim 17, wherein the remaining blocks in the second set of blocks are adjacent to the single parent block.

19. A data processing system, comprising:
a memory containing:
   a first program; and
   a development tool for developing a second program, including (I) a region divided into multiple blocks, wherein each block is formed of a set of values associated with a function and has a state reflected by a designated portion of the first program that when executed transforms the values forming the block based on the function, (ii) any dependencies among the blocks, each dependency indicating a relationship between two sets of blocks and requiring the portion of the first program associated with a first set of blocks of the relationship to be executed before the portion of the first program associated with a second set of blocks of the relationship, and (iii) distribution groups that determine how the blocks are processed in parallel; and
at least one processor for running the development tool.

20. A computer-implemented method for developing a program, comprising:
defining a region divided into multiple blocks, wherein each block is formed of a set of values associated with the function;
defining sets of the blocks, each block in a set having a state reflected by a designated portion of the program that when executed transforms the values forming the block based on the function;
assigning sets of blocks to distribution groups that determine how the blocks are processed in parallel;
storing any dependencies among the blocks, each dependency indicating a relationship between two of sets of blocks and requiring the portion of the program associated with a first set of blocks of the relationship to be executed before the portion of the program associated with a second set of blocks of the relationship.

21. A computer-implemented method for converting a control flow program into a data flow program for execution by a multiprocessor computer system, comprising:
defining a region divided into multiple blocks, wherein each block is formed of a set of values associated with the function;
defining sets of the blocks, each block in a set having a state reflected by a designated portion of the control flow program that when executed transforms the values forming the block based on the function;
assigning sets of blocks to distribution groups that determine how the blocks are processed in parallel;
storing any dependencies among the blocks, each dependency indicating a relationship between two of sets of blocks and requiring the portion of the control flow program associated with a first set of blocks of the relationship to be executed before the portion of the control flow program associated with a second set of blocks of the relationship.

* * * * *